(12) United States Patent
Chen et al.

(10) Patent No.: US 8,582,215 B2
(45) Date of Patent: *Nov. 12, 2013

(54) PHOTOGRAPHING OPTICAL LENS ASSEMBLY

(75) Inventors: Chun Shan Chen, Taichung (TW);
Hsiang Chi Tang, Taichung (TW);
Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 38 days.

This patent is subject to a terminal disclaimer.

(21) Appl. No.: 13/420,210

(22) Filed: Mar. 14, 2012

(65) Prior Publication Data

US 2012/0170139 A1    Jul. 5, 2012

Related U.S. Application Data

(62) Division of application No. 12/823,831, filed on Jun. 25, 2010, now Pat. No. 8,199,418.

(51) Int. Cl.
*G02B 13/18* (2006.01)
*G02B 9/34* (2006.01)

(52) U.S. Cl.
USPC .......................................... 359/715; 359/773

(58) Field of Classification Search
USPC ..................................... 359/715, 773
See application file for complete search history.

(56) References Cited

U.S. PATENT DOCUMENTS 8,294,997 B2 * 10/2012 Tang et al. .................... 359/773

* cited by examiner

*Primary Examiner* — Scott J Sugarman
(74) *Attorney, Agent, or Firm* — Morris Manning & Martin LLP; Tim Tingkang Xia, Esq.

(57) ABSTRACT

This invention provides a photographing optical lens assembly, from an object side to an image side in order, comprising a first lens element with positive refractive power having a convex object-side surface, a second lens element with negative refractive power having a concave image-side surface, a third lens element with positive refractive power, a fourth lens element with negative refractive power having a concave image-side surface, both the two surfaces of the fourth lens thereof being aspheric. And an aperture stop is positioned between the first element and the second lens element. There are four lens elements with refractive power in the lens assembly.

5 Claims, 29 Drawing Sheets

| TABLE 1 | | | | | | | |
|---|---|---|---|---|---|---|---|
| (Embodiment 1) | | | | | | | |
| f = 2.72 mm, Fno = 2.85, HFOV = 33.1 deg. | | | | | | | |
| Surface # | | Curvature Radius | Thickness | Material | Index | Abbe # | Focal length |
| 0 | Object | Plano | Infinity | | | | |
| 1 | Lens 1 | 1.11312 (ASP) | 0.488 | Plastic | 1.544 | 55.9 | 1.62 |
| 2 | | -3.53700 (ASP) | -0.014 | | | | |
| 3 | Ape. Stop | Plano | 0.074 | | | | |
| 4 | Lens 2 | -9.51150 (ASP) | 0.341 | Plastic | 1.632 | 23.4 | -2.38 |
| 5 | | 1.80750 (ASP) | 0.355 | | | | |
| 6 | Lens 3 | -1.73542 (ASP) | 0.626 | Plastic | 1.544 | 55.9 | 1.47 |
| 7 | | -0.61619 (ASP) | 0.105 | | | | |
| 8 | Lens 4 | -6.24950 (ASP) | 0.315 | Plastic | 1.544 | 55.9 | -1.51 |
| 9 | | 0.96095 (ASP) | 0.400 | | | | |
| 10 | IR-filter | Plano | 0.300 | Glass | 1.517 | 64.2 | - |
| 11 | | Plano | 0.325 | | | | |
| 12 | Image | Plano | - | | | | |

Fig. 15

| TABLE 2 | | | | |
|---|---|---|---|---|
| Aspheric Coefficients | | | | |
| Surface # | 1 | 2 | 4 | 5 |
| k = | -9.07221E+00 | 5.00000E+00 | 5.00000E+00 | 3.46207E+00 |
| A4 = | 7.72227E-01 | 4.08182E-01 | 6.54295E-01 | 2.80714E-01 |
| A6 = | -2.17761E+00 | -1.57365E+00 | -4.65596E+00 | -4.10496E-01 |
| A8 = | 7.32039E+00 | -4.13016E+00 | 2.90443E+01 | -1.21509E+00 |
| A10= | -2.37714E+01 | 4.12524E+01 | -1.49971E+02 | 1.05124E+01 |
| A12= | 4.74190E+01 | -1.25155E+02 | 4.24813E+02 | -2.58837E+01 |
| A14= | -4.57989E+01 | 1.29150E+02 | -4.67710E+02 | 2.82385E+01 |
| Surface # | 6 | 7 | 8 | 9 |
| k = | -1.84176E+00 | -4.32336E+00 | 7.54766E+00 | -1.10161E+01 |
| A4 = | -3.39400E-01 | -9.74121E-01 | -4.27398E-01 | -3.67360E-01 |
| A6 = | 1.87789E+00 | 2.42476E+00 | 3.66709E-01 | 3.23616E-01 |
| A8 = | -2.00405E+01 | -5.56649E+00 | 5.54530E-02 | -2.17519E-01 |
| A10= | 8.95161E+01 | 7.12864E+00 | -1.84535E-01 | 7.71866E-02 |
| A12= | -1.90138E+02 | -3.32879E+00 | 8.31252E-02 | -1.16691E-02 |
| A14= | 1.57672E+02 | 1.36750E-04 | -1.24207E-02 | 4.23599E-04 |

Fig. 16

| TABLE 3 | | | | | | | |
|---|---|---|---|---|---|---|---|
| (Embodiment 2) | | | | | | | |
| f = 4.57 mm, Fno = 2.85, HFOV = 31.8 deg. | | | | | | | |
| Surface # | | Curvature Radius | Thickness | Material | Index | Abbe # | Focal length |
| 0 | Object | Plano | Infinity | | | | |
| 1 | Lens 1 | 1.44020 (ASP) | 0.642 | Plastic | 1.544 | 55.9 | 2.52 |
| 2 | | -24.65850 (ASP) | 0.015 | | | | |
| 3 | Ape. Stop | Plano | 0.049 | | | | |
| 4 | Lens 2 | -25.00000 (ASP) | 0.369 | Plastic | 1.632 | 23.4 | -4.29 |
| 5 | | 3.06060 (ASP) | 0.935 | | | | |
| 6 | Lens 3 | -1.63097 (ASP) | 0.795 | Plastic | 1.544 | 55.9 | 2.28 |
| 7 | | -0.82482 (ASP) | 0.114 | | | | |
| 8 | Lens 4 | -13.82870 (ASP) | 0.400 | Plastic | 1.530 | 55.8 | -2.29 |
| 9 | | 1.34461 (ASP) | 0.800 | | | | |
| 10 | IR-filter | Plano | 0.200 | Glass | 1.517 | 64.2 | - |
| 11 | | Plano | 0.699 | | | | |
| 12 | Image | Plano | - | | | | |

Fig. 17

| TABLE 4A | | | | |
|---|---|---|---|---|
| Aspheric Coefficients | | | | |
| Surface # | 1 | 2 | 4 | 5 |
| k = | -5.43793E-01 | -8.59803E+00 | -2.14749E-01 | 5.00000E+00 |
| A4 = | 1.26659E-02 | -8.37485E-02 | -1.94495E-02 | 7.58927E-02 |
| A6 = | -1.90852E-02 | 1.17121E-01 | 1.45366E-01 | 4.58898E-02 |
| A8 = | 2.42863E-02 | -1.18300E-01 | -4.11414E-03 | 6.91819E-02 |
| A10= | -4.90397E-02 | 3.47089E-02 | -2.02763E-01 | |
| A12= | | | 2.08668E-01 | |
| Surface # | 6 | 7 | 8 | |
| k = | -9.99627E-04 | -3.71743E+00 | 4.46095E+01 | |
| A4 = | -8.57882E-02 | -2.34108E-01 | -6.89851E-02 | |
| A6 = | -1.73682E-01 | 1.22155E-01 | 2.99373E-02 | |
| A8 = | 2.52671E-01 | -6.48451E-02 | -2.95486E-03 | |
| A10= | -4.73961E-01 | -1.43033E-02 | -6.03580E-04 | |
| A12= | 5.00829E-01 | 2.38590E-02 | -5.85877E-05 | |
| A14= | -1.81882E-01 | 4.57785E-03 | 7.08843E-05 | |
| A16= | -7.46180E-03 | -4.48295E-03 | -7.47359E-06 | |

| TABLE 4B | |
|---|---|
| Aspheric Coefficients | |
| Surface # | 9 |
| k = | -1.35559E+01 |
| A1 = | |
| A2 = | |
| A3 = | |
| A4 = | -9.18164E-02 |
| A5 = | |
| A6 = | 3.79465E-02 |
| A7 = | |
| A8 = | -1.29973E-02 |
| A9 = | |
| A10= | 2.27857E-03 |
| A11= | |
| A12= | -6.78102E-05 |
| A13= | |
| A14= | -4.09748E-05 |
| A15= | |
| A16= | 4.50673E-06 |

Fig. 18

| TABLE 5 | | | | | | | |
|---|---|---|---|---|---|---|---|
| (Embodiment 3) | | | | | | | |
| f = 3.76 mm, Fno = 2.50, HFOV = 30.6 deg. | | | | | | | |
| Surface # | | Curvature Radius | Thickness | Material | Index | Abbe # | Focal length |
| 0 | Object | Plano | Infinity | | | | |
| 1 | Lens 1 | 1.79236 (ASP) | 0.702 | Plastic | 1.544 | 55.9 | 2.19 |
| 2 | | -3.06890 (ASP) | -0.043 | | | | |
| 3 | Ape. Stop | Plano | 0.168 | | | | |
| 4 | Lens 2 | -4.65120 (ASP) | 0.575 | Plastic | 1.632 | 23.4 | -3.08 |
| 5 | | 3.51120 (ASP) | 0.464 | | | | |
| 6 | Lens 3 | -3.00120 (ASP) | 1.100 | Plastic | 1.544 | 55.9 | 2.05 |
| 7 | | -0.91818 (ASP) | 0.249 | | | | |
| 8 | Lens 4 | 9.52380 (ASP) | 0.300 | Plastic | 1.530 | 55.8 | -2.06 |
| 9 | | 0.96826 (ASP) | 0.533 | | | | |
| 10 | IR-filter | Plano | 0.300 | Glass | 1.517 | 64.2 | - |
| 11 | | Plano | 0.406 | | | | |
| 12 | Image | Plano | - | | | | |

Fig. 19

| TABLE 6A | | | | |
|---|---|---|---|---|
| Aspheric Coefficients | | | | |
| Surface # | 1 | 2 | 4 | 5 |
| k = | -5.18509E-01 | -3.33905E+01 | -1.00000E+00 | 4.11208E+00 |
| A4 = | 3.49457E-05 | 2.96369E-02 | 2.67862E-01 | 1.66708E-01 |
| A6 = | -4.55220E-02 | -9.17243E-02 | -4.15914E-01 | -1.98962E-01 |
| A8 = | 6.51602E-02 | -2.42042E-02 | 3.83901E-01 | 2.25433E-01 |
| A10= | -7.79815E-02 | 2.51248E-02 | -1.78205E-01 | -8.27646E-02 |
| Surface # | 6 | 7 | 8 | |
| k = | -1.12706E+00 | -1.30962E+00 | -1.00000E+00 | |
| A4 = | -4.56596E-02 | 2.01105E-01 | -2.34695E-01 | |
| A6 = | 2.54302E-02 | -4.02832E-01 | 8.81942E-02 | |
| A8 = | -3.32017E-01 | 3.51391E-01 | -4.03093E-02 | |
| A10= | 2.06893E-01 | -1.58354E-01 | 2.08805E-02 | |
| A12= | 5.84078E-01 | -1.79126E-02 | -1.45209E-03 | |
| A14= | -9.27175E-01 | 4.99293E-02 | -2.15920E-03 | |
| A16= | 4.33941E-01 | -1.39098E-02 | 4.43370E-04 | |

| TABLE 6B | |
|---|---|
| Aspheric Coefficients | |
| Surface # | 9 |
| k = | -5.61223E+00 |
| A1 = | |
| A2 = | |
| A3 = | |
| A4 = | -1.65649E-01 |
| A5 = | |
| A6 = | 8.29262E-02 |
| A7 = | |
| A8 = | -3.33359E-02 |
| A9 = | |
| A10= | 5.86801E-03 |
| A11= | |
| A12= | 6.12636E-04 |
| A13= | |
| A14= | -3.75788E-04 |
| A15= | |
| A16= | 3.66007E-05 |

Fig. 20

| TABLE 7 | | | | | | |
|---|---|---|---|---|---|---|
| (Embodiment 4) | | | | | | |
| f = 3.42 mm, Fno = 2.80, HFOV = 33.0 deg. | | | | | | |
| Surface # | | Curvature Radius | Thickness | Material | Index | Abbe # | Focal length |
| 0 | Object | Plano | Infinity | | | | |
| 1 | Lens 1 | 1.56985 (ASP) | 0.592 | Plastic | 1.544 | 55.9 | 2.68 |
| 2 | | -18.18180 (ASP) | 0.018 | | | | |
| 3 | Ape. Stop | Plano | 0.089 | | | | |
| 4 | Lens 2 | 9.70870 (ASP) | 0.300 | Plastic | 1.632 | 23.4 | -4.42 |
| 5 | | 2.14269 (ASP) | 0.604 | | | | |
| 6 | Lens 3 | -2.64863 (ASP) | 0.900 | Plastic | 1.544 | 55.9 | 2.26 |
| 7 | | -0.94122 (ASP) | 0.391 | | | | |
| 8 | Lens 4 | 3.12500 (ASP) | 0.340 | Plastic | 1.583 | 30.2 | -2.36 |
| 9 | | 0.91611 (ASP) | 0.533 | | | | |
| 10 | IR-filter | Plano | 0.300 | Glass | 1.517 | 64.2 | - |
| 11 | | Plano | 0.325 | | | | |
| 12 | Image | Plano | - | | | | |

Fig. 21

TABLE 8A

| | | | Aspheric Coefficients | | | |
|---|---|---|---|---|---|---|
| Surface # | 1 | 2 | 4 | 5 | 6 | 7 |
| k = | -3.01678E-01 | -1.00000E+00 | -1.00000E+00 | -6.62345E+00 | 5.67404E-01 | -9.49566E-01 |
| A4 = | 2.39725E-02 | 1.37339E-02 | -3.68222E-04 | 1.26255E-01 | -6.10550E-02 | 1.03733E-01 |
| A6 = | -6.19364E-02 | 1.69233E-02 | -6.68315E-02 | -1.57316E-02 | -7.34310E-03 | -2.74186E-01 |
| A8 = | 1.80843E-01 | -5.09358E-01 | -2.88268E-01 | -1.37201E-02 | -3.40913E-01 | 3.10383E-01 |
| A10= | -2.18630E-01 | 5.09817E-01 | 1.43726E-01 | | 4.58472E-01 | -2.23341E-01 |
| A12= | | | | | 6.03989E-01 | 1.60130E-02 |
| A14= | | | | | -1.02809E+00 | 9.16945E-02 |
| A16= | | | | | 3.74229E-01 | -3.36838E-02 |

TABLE 8B

| | Aspheric Coefficients | |
|---|---|---|
| Surface # | 8 | 9 |
| k = | -1.00000E+00 | -4.70223E+00 |
| A1 = | | |
| A2 = | | |
| A3 = | | |
| A4 = | -3.88024E-01 | -2.13968E-01 |
| A5 = | | |
| A6 = | 2.08596E-01 | 1.19788E-01 |
| A7 = | | |
| A8 = | -6.15711E-02 | -4.73336E-02 |
| A9 = | | |
| A10= | 1.34761E-02 | 8.97666E-03 |
| A11= | | |
| A12= | -4.85291E-04 | 6.08660E-04 |
| A13= | | |
| A14= | -1.14619E-03 | -5.21237E-04 |
| A15= | | |
| A16= | 2.35661E-04 | 5.59110E-05 |

Fig. 22

| TABLE 9 | | | | | | |
|---|---|---|---|---|---|---|
| (Embodiment 5) | | | | | | |
| f = 2.92 mm, Fno = 2.47, HFOV = 33.1 deg. | | | | | | |
| Surface # | | Curvature Radius | Thickness | Material | Index | Abbe # | Focal length |
| 0 | Object | Plano | Infinity | | | | |
| 1 | Lens 1 | 1.05869 (ASP) | 0.543 | Plastic | 1.544 | 55.9 | 1.74 |
| 2 | | -7.37890 (ASP) | 0.009 | | | | |
| 3 | Ape. Stop | Plano | 0.064 | | | | |
| 4 | Lens 2 | -7.01380 (ASP) | 0.300 | Plastic | 1.632 | 23.4 | -2.78 |
| 5 | | 2.38492 (ASP) | 0.463 | | | | |
| 6 | Lens 3 | -1.69999 (ASP) | 0.590 | Plastic | 1.544 | 55.9 | 1.70 |
| 7 | | -0.67302 (ASP) | 0.107 | | | | |
| 8 | Lens 4 | -23.87910 (ASP) | 0.320 | Plastic | 1.544 | 55.9 | -1.60 |
| 9 | | 0.90530 (ASP) | 0.429 | | | | |
| 10 | IR-filter | Plano | 0.300 | Glass | 1.517 | 64.2 | - |
| 11 | | Plano | 0.270 | | | | |
| 12 | Image | Plano | - | | | | |

Fig. 23

| TABLE 10A | | | | |
|---|---|---|---|---|
| Aspheric Coefficients | | | | |
| Surface # | 1 | 2 | 4 | 5 |
| k = | -6.60895E+00 | 5.00000E+00 | 4.23982E+00 | 4.98174E+00 |
| A4 = | 6.81251E-01 | 2.48201E-01 | 5.37192E-01 | 3.18223E-01 |
| A6 = | -1.47683E+00 | -4.33294E-01 | -3.17587E+00 | 5.80483E-02 |
| A8 = | 5.01928E+00 | -2.95662E+00 | 1.99742E+01 | -3.21822E+00 |
| A10= | -1.39872E+01 | 1.97993E+01 | -9.07582E+01 | 1.50627E+01 |
| A12= | 2.28705E+01 | -5.65539E+01 | 2.18117E+02 | -2.39499E+01 |
| A14= | -1.63974E+01 | 5.87273E+01 | -2.12952E+02 | 1.31201E+01 |
| Surface # | 7 | 8 | 9 | |
| k = | -4.95802E+00 | -1.41637E+00 | -9.82193E+00 | |
| A4 = | -7.50125E-01 | -3.68291E-01 | -2.91822E-01 | |
| A6 = | 1.68765E+00 | 2.66313E-01 | 2.39309E-01 | |
| A8 = | -3.62830E+00 | 3.80551E-02 | -1.45704E-01 | |
| A10= | 4.12955E+00 | -1.06924E-01 | 4.70123E-02 | |
| A12= | -1.74593E+00 | 4.24790E-02 | -6.44424E-03 | |
| A14= | 4.96955E-02 | -5.59041E-03 | 1.92941E-04 | |

| TABLE 10B | |
|---|---|
| Aspheric Coefficients | |
| Surface # | 6 |
| k = | -5.50622E+00 |
| A1 = | |
| A2 = | |
| A3 = | |
| A4 = | -2.84743E-01 |
| A5 = | |
| A6 = | 1.15144E+00 |
| A7 = | |
| A8 = | -1.35905E+01 |
| A9 = | |
| A10= | 5.26616E+01 |
| A11= | |
| A12= | -9.44000E+01 |
| A13= | |
| A14= | 6.51421E+01 |

Fig. 24

| TABLE 11 | | | | | | | |
|---|---|---|---|---|---|---|---|
| (Embodiment 6) | | | | | | | |
| f = 2.92 mm, Fno = 2.45, HFOV = 31.5 deg. | | | | | | | |
| Surface # | | Curvature Radius | Thickness | Material | Index | Abbe # | Focal length |
| 0 | Object | Plano | Infinity | | | | |
| 1 | Lens 1 | 1.20671 (ASP) | 0.483 | Plastic | 1.544 | 55.9 | 1.71 |
| 2 | | -3.47500 (ASP) | -0.037 | | | | |
| 3 | Ape. Stop | Plano | 0.087 | | | | |
| 4 | Lens 2 | -5.62310 (ASP) | 0.300 | Plastic | 1.632 | 23.4 | -2.78 |
| 5 | | 2.60470 (ASP) | 0.559 | | | | |
| 6 | Lens 3 | -1.28506 (ASP) | 0.582 | Plastic | 1.544 | 55.9 | 1.46 |
| 7 | | -0.56890 (ASP) | 0.055 | | | | |
| 8 | Lens 4 | -8.60550 (ASP) | 0.412 | Plastic | 1.530 | 55.8 | -1.49 |
| 9 | | 0.88221 (ASP) | 0.450 | | | | |
| 10 | IR-filter | Plano | 0.300 | Glass | 1.517 | 64.2 | - |
| 11 | | Plano | 0.383 | | | | |
| 12 | Image | Plano | - | | | | |

Fig. 25

| TABLE 12A | | | | |
|---|---|---|---|---|
| Aspheric Coefficients | | | | |
| Surface # | 1 | 2 | 4 | 5 |
| k = | -5.12543E-01 | -4.56541E+01 | -5.00000E+01 | -1.36866E+01 |
| A4 = | 5.22387E-05 | -4.09754E-02 | 2.40549E-01 | 3.60830E-01 |
| A6 = | -2.40444E-01 | 1.72263E-01 | 3.37400E-01 | 2.06326E-02 |
| A8 = | 5.64581E-01 | -1.39477E+00 | -2.78304E+00 | 2.14698E-01 |
| A10= | -1.28637E+00 | 1.28574E+00 | 6.51986E+00 | |
| A12= | | | -5.31993E+00 | |
| Surface # | 6 | 7 | 8 | |
| k = | 6.82531E-01 | -3.13506E+00 | 4.11889E+01 | |
| A4 = | -2.18469E-01 | -6.57926E-01 | -2.33379E-01 | |
| A6 = | -9.07067E-01 | 6.34363E-01 | 2.72919E-01 | |
| A8 = | 4.61385E+00 | -5.02943E-01 | -8.32627E-02 | |
| A10= | -1.85590E+01 | -6.89802E-01 | -1.39278E-02 | |
| A12= | 4.31762E+01 | 1.45250E+00 | -1.27833E-02 | |
| A14= | -3.57794E+01 | 7.42837E-01 | 1.62185E-02 | |
| A16= | 9.26844E-01 | -1.29171E+00 | -2.65384E-03 | |

| TABLE 12B | |
|---|---|
| Aspheric Coefficients | |
| Surface # | 9 |
| k = | -9.84627E+00 |
| A1 = | |
| A2 = | |
| A3 = | |
| A4 = | -2.54719E-01 |
| A5 = | |
| A6 = | 2.17677E-01 |
| A7 = | |
| A8 = | -1.50783E-01 |
| A9 = | |
| A10= | 5.74501E-02 |
| A11= | |
| A12= | -5.96411E-03 |
| A13= | |
| A14= | -3.53024E-03 |
| A15= | |
| A16= | 9.16334E-04 |

Fig. 26

| TABLE 13 | | | | | | |
|---|---|---|---|---|---|---|
| (Embodiment 7) | | | | | | |
| f = 2.74 mm, Fno = 2.85, HFOV = 33.0 deg. | | | | | | |
| Surface # | | Curvature Radius | Thickness | Material | Index | Abbe # | Focal length |
| 0 | Object | Plano | Infinity | | | | |
| 1 | Lens 1 | 1.12376 (ASP) | 0.435 | Plastic | 1.544 | 55.9 | 1.69 |
| 2 | | -4.39360 (ASP) | -0.016 | | | | |
| 3 | Ape. Stop | Plano | 0.081 | | | | |
| 4 | Lens 2 | -6.83070 (ASP) | 0.318 | Plastic | 1.632 | 23.4 | -2.89 |
| 5 | | 2.54206 (ASP) | 0.413 | | | | |
| 6 | Lens 3 | -1.39259 (ASP) | 0.610 | Plastic | 1.544 | 55.9 | 1.39 |
| 7 | | -0.56559 (ASP) | 0.085 | | | | |
| 8 | Lens 4 | -7.56830 (ASP) | 0.350 | Plastic | 1.544 | 55.9 | -1.37 |
| 9 | | 0.84259 (ASP) | 0.200 | | | | |
| 10 | IR-filter | Plano | 0.200 | Glass | 1.517 | 64.2 | - |
| 11 | | Plano | 0.635 | | | | |
| 12 | Image | Plano | - | | | | |

Fig. 27

| TABLE 14A | | | | |
|---|---|---|---|---|
| Aspheric Coefficients | | | | |
| Surface # | 1 | 2 | 4 | 5 |
| k  = | -5.03545E-01 | -3.30483E+01 | -7.06915E+00 | -8.77766E+00 |
| A4 = | 1.38721E-02 | 6.50329E-02 | 4.28215E-01 | 4.81793E-01 |
| A6 = | -4.26496E-01 | -3.18860E-01 | -1.09190E+00 | -1.78893E-01 |
| A8 = | 1.53004E+00 | -3.12638E+00 | 6.00750E-01 | 3.40969E-01 |
| A10= | -4.14356E+00 | 5.74238E+00 | 2.58045E+00 | |
| A12= | | | -1.00828E+01 | |
| Surface # | 6 | 7 | 8 | |
| k  = | -3.37015E-01 | -3.52811E+00 | 3.59862E+01 | |
| A4 = | -1.13610E-01 | -7.64092E-01 | -4.19287E-01 | |
| A6 = | -1.54958E+00 | 9.16724E-01 | 3.99467E-01 | |
| A8 = | 8.04357E+00 | -6.26682E-01 | -8.03023E-02 | |
| A10= | -2.93061E+01 | -1.26633E+00 | -2.16868E-02 | |
| A12= | 7.18221E+01 | 2.51890E+00 | -2.89534E-02 | |
| A14= | -8.02512E+01 | 1.45572E+00 | 3.12391E-02 | |
| A16= | 2.22150E+01 | -2.77048E+00 | -5.86037E-03 | |

| TABLE 14B | |
|---|---|
| Aspheric Coefficients | |
| Surface # | 9 |
| k  = | -9.94010E+00 |
| A1 = | |
| A2 = | |
| A3 = | |
| A4 = | -3.41034E-01 |
| A5 = | |
| A6 = | 3.15587E-01 |
| A7 = | |
| A8 = | -2.36291E-01 |
| A9 = | |
| A10= | 9.44156E-02 |
| A11= | |
| A12= | -8.40353E-03 |
| A13= | |
| A14= | -7.27069E-03 |
| A15= | |
| A16= | 1.94944E-03 |

Fig. 28

| TABLE 15 | | | | | | | |
|---|---|---|---|---|---|---|---|
| | Embodiment 1 | Embodiment 2 | Embodiment 3 | Embodiment 4 | Embodiment 5 | Embodiment 6 | Embodiment 7 |
| f | 2.72 | 4.57 | 3.76 | 3.42 | 2.92 | 2.92 | 2.74 |
| Fno | 2.85 | 2.85 | 2.50 | 2.80 | 2.47 | 2.45 | 2.85 |
| HFOV | 33.1 | 31.8 | 30.6 | 33.0 | 33.1 | 31.5 | 33.0 |
| V1-V2 | 32.5 | 32.5 | 32.5 | 32.5 | 32.5 | 32.5 | 32.5 |
| (T12/f)*100 | 2.2 | 1.4 | 3.3 | 3.1 | 2.5 | 1.7 | 2.4 |
| R1/R2 | -0.31 | -0.06 | -0.58 | -0.09 | -0.14 | -0.35 | -0.26 |
| R3/R4 | -5.26 | -8.17 | -1.32 | 4.53 | -2.94 | -2.16 | -2.69 |
| R5/R6 | 2.82 | 1.98 | 3.27 | 2.81 | 2.53 | 2.26 | 2.46 |
| (R5+R6)/(R5-R6) | 2.10 | 3.05 | 1.88 | 2.10 | 2.31 | 2.59 | 2.37 |
| R1/f | 0.41 | 0.32 | 0.48 | 0.46 | 0.36 | 0.41 | 0.41 |
| R8/f | 0.35 | 0.29 | 0.26 | 0.27 | 0.31 | 0.30 | 0.31 |
| f/f1 | 1.68 | 1.81 | 1.72 | 1.28 | 1.68 | 1.71 | 1.62 |
| f/f4 | -1.80 | -2.00 | -1.83 | -1.45 | -1.83 | -1.96 | -2.00 |
| f3/f4 | -0.97 | -0.99 | -1.00 | -0.96 | -1.07 | -0.98 | -1.01 |
| (f/f1)-(f/f3) | -0.17 | -0.19 | -0.12 | -0.24 | -0.04 | -0.29 | -0.35 |
| SL/TTL | 0.85 | 0.87 | 0.86 | 0.86 | 0.83 | 0.87 | 0.87 |
| TTL/ImgH | 1.80 | 1.75 | 2.08 | 1.92 | 1.71 | 1.94 | 1.82 |

Fig. 29

PHOTOGRAPHING OPTICAL LENS ASSEMBLY

CROSS-REFERENCE TO RELATED APPLICATIONS

This non-provisional application is a divisional application of U.S. patent application Ser. No. 12/823,831, filed Jun. 25, 2010, which itself claims priority under 35 U.S.C. §119(a) on Patent Application No. 099112824 filed in Taiwan, R.O.C. on Apr. 23, 2010, the entire contents of which are hereby incorporated by reference.

BACKGROUND OF THE INVENTION

1. Field of the Invention

The present invention relates to a photographing optical lens assembly, and more particularly, to a photographing optical lens assembly with reduced optical sensitivity and high resolution.

2. Description of the Prior Art

A conventional high resolution compact photographing optical lens assembly is generally configured such that a frontal aperture stop is adopted and there are four lens elements in the assembly, wherein the first lens element and the second lens element with spherical surfaces made of glass are usually combined together into a doublet lens structure in order to correct chromatic aberrations. This is disclosed in U.S. Pat. No. 7,365,920 and there are drawbacks with this method. First, an arrangement of too many spherical lenses will limit the freedom in optical system design, which makes it difficult to shorten the total track length of the system. Secondly, the bonding of glass lenses is difficult in manufacturing process. A lens assembly with four independent lenses is disclosed in U.S. Pat. No. 7,277,238, including multiple aspheric lenses which effectively shorten the total track length of the system and obtaining good image quality. However, due to the aperture stop of the system is positioned in front of the first lens element, the system sensitivity is increased which also increases the difficulty in controlling the yields in manufacturing.

SUMMARY OF THE INVENTION

The present invention provides a photographing optical lens assembly comprising, in order from an object side to an image side: a first lens element with positive refractive power having a convex object-side surface and a convex image-side surface; a second lens element with negative refractive power having a concave object-side surface and a concave image-side surface; a third lens element with positive refractive power; and a fourth lens element with negative refractive power having a concave image-side surface, both of the object-side and image-side surfaces thereof being aspheric; wherein the photographing optical lens assembly also provides an aperture stop and an electronic sensor; wherein the aperture stop is disposed between the first lens element and the second lens element; wherein the electronic sensor is disposed on the image plane for image formation; wherein there are four lens elements with refractive power in the photographing optical lens assembly; and wherein a focal length of the photographing optical lens assembly is f, a focal length of the first lens element is f1, a focal length of the third lens element is f3 , a radius of curvature of the object-side surface of the first lens element is R1, a radius of curvature of the object-side surface of the third lens element is R5, a radius of curvature of the image-side surface of the third lens element is R6, a distance on the optical axis between the aperture stop and the image plane is SL, a distance on the optical axis between the object-side surface of the first lens element and the electronic sensor is TTL, and they satisfy the relations: −0.27<(f/f1)−(f/f3)<−0.05; 0.2<R1/f<0.5; 1.40<R5/R6<4.30; 0.77<SL/TTL<0.92.

According to another aspect of the present invention, a photographing optical lens assembly comprises, in order from the object side to the image side: a first lens element with positive refractive power having a convex object-side surface and a convex image-side surface; a second lens element with negative refractive power having a concave image-side surface; a third lens element with positive refractive power having a concave object-side surface and a convex image-side surface, at least one of the object-side and image-side surfaces thereof being aspheric; and a fourth lens element with negative refractive power having a concave image-side surface, both of the object-side and image-side surfaces thereof being aspheric, at least one inflection point formed on the object-side and image-side surfaces; wherein the photographing optical lens assembly also provides an aperture stop and an electronic sensor; wherein an aperture stop is disposed between the first lens element and the second lens element; wherein the electronic sensor is disposed on the image plane for image formation; wherein there are four lens elements with refractive power in the photographing optical lens assembly; wherein a focal length of the photographing optical lens assembly is f, a focal length of the first lens element is f1, a focal length of the third lens element is f3, an Abbe number of the first lens element is V1, an Abbe number of the second lens element is V2, a radius of curvature of the object-side surface of the first lens element is R1, a radius of curvature of the image-side surface of the first lens element is R2, a radius of curvature of the object-side surface of the third lens element is R5, a radius of curvature of the image-side surface of the third lens element is R6, a distance on the optical axis between the aperture stop and the image plane is SL, a distance on the optical axis between the object-side surface of the first lens element and the electronic sensor is TTL, half of the diagonal length of the effective pixel area of the electronic sensor is ImgH, and they satisfy the relations: −0.27<(f/f1)−(f/f3)<−0.05; 31.0<V1−V2<42.0; −2.00<R1/R2<−0.01; 1.40<R5/R6<4.30; 0.77<SL/TTL<0.92; TTL/ImgH<1.95.

According to another aspect of the present invention, a photographing optical lens assembly comprises, in order from the object side to the image side: a first lens element with positive refractive power having a convex object-side surface; a second lens element with negative refractive power having a concave image-side surface; a third lens element with positive refractive power having a concave object-side surface and a convex image-side surface, at least one of the object-side and image-side surfaces thereof being aspheric; and a fourth lens element with negative refractive power having a concave image-side surface, both of the object-side and image-side surfaces thereof being aspheric, at least one inflection point formed on the object-side and image-side surfaces; wherein the photographing optical lens assembly provides an aperture stop and an electronic sensor; wherein the aperture stop is disposed between the first lens element and the second lens element; wherein the electronic sensor is disposed on the image plane for image formation; and wherein there are four lens elements with refractive power in the photographing optical lens assembly; and wherein a focal length of the photographing lens assembly is f, a focal length of the fourth lens element is f4, a radius of curvature of the object-side surface of the third lens element is R5, a radius of curvature of the image-side surface of the third lens element is R6, an Abbe number of the first lens element is V1, an Abbe number of the second lens element is V2, a distance on the optical axis between the aperture stop and the image plane is SL, a distance on the optical axis between the object-side surface of the first lens element and the electronic sensor is TTL, and they satisfy the relations: $-2.5<f/f4<-1.5$; $2.0<(R5+R6)/(R5-R6)<5.0$; $31.0<V1-V2<42.0$; $0.77<SL/TTL<0.92$.

Such an arrangement of optical elements can effectively reduce the total track length of the lens assembly, lower the sensitivity of the optical system, and obtain higher resolution image quality.

In the aforementioned photographing optical lens assembly, the first lens element with positive refractive power supplies refractive power for the system and reduces the total track length of the system; the second lens element with negative refractive power may correct the chromatic aberration of the system; the third lens element with positive refractive power can effectively distribute the refractive power of the first lens element and reduce the sensitivity of the system; the fourth lens element with negative refractive power acts as a corrective lens, which can balance and correct the various aberrations in the system.

In the aforementioned photographing optical lens assembly of the present invention, the first lens element can be a bi-convex lens element or a meniscus lens element having a concave object-side surface and a convex image-side surface. When the first lens element is a bi-convex lens element, the refractive power thereof can be effectively enhanced, thus shortening the total track length of the system. When the second lens element is a meniscus lens element with a convex object-side surface and a concave image-side surface, the spherical aberration of the system can be corrected more favorably. When the image-side surface of the second lens element is concave, Petzval Sum of the system can be effectively corrected and the back focal distance of the system can be enlarged to obtain enough back focal distance for placing other components in the photographing optical lens assembly. When the second lens element is a bi-convex lens element, chromatic aberration of the system can be favorably corrected with the corresponding choice of materials. When the second lens element is a meniscus lens element with a convex object-side surface and a concave image-side surface, astigmatism of the system can be favorably corrected, and the sensitivity of the system can be reduced. When the third lens element has a concave object-side surface and a convex image-side surface, high order aberration can be favorably corrected. The fourth lens element can be a bi-concave lens element or a meniscus lens element with a convex object-side surface and a concave image-side surface. When the fourth lens element is a bi-concave lens element, the principal point of the optical system can be further away from the image plane, which reduces the total track length of the system in order for the system to stay compact. When the fourth lens element has a convex object-side surface and a concave image-side surface, astigmatism and high order aberrations of the system can be favorably corrected.

In the aforementioned photographing optical lens assembly, the aperture stop is disposed between the first lens element and the second lens element. By providing positive refractive power from the first and third lens elements, while the aperture stop is disposed closer to the object side of the photographing optical lens assembly, the total track length of the photographing optical lens assembly can be effectively reduced. In addition, the aforementioned arrangement also enables the exit pupil of the photographing optical lens assembly to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the fourth lens element is provided with at least one inflection point, thereby the angle at which the light is projected onto the sensor from the off-axis field can be effectively reduced to further correct the off-axis aberrations. Additionally, in a wide angle optical system, the correction of the distortion and chromatic aberration of magnification is especially needed. This is done through placing the aperture stop at a position where the refractive power of the system is balanced. Therefore, in the aforementioned photographing optical lens assembly of the present invention, the aperture stop is disposed between the first lens element and the second lens element which obtains a good balance between reducing the total track length of the lens assembly and lowering the sensitivity of the system.

BRIEF DESCRIPTION OF THE DRAWINGS

FIG. 15 is TABLE 1 which lists the optical data of the first embodiment.

FIG. 16 is TABLE 2 which lists the aspheric surface data of the first embodiment.

FIG. 17 is TABLE 3 which lists the optical data of the second embodiment.

FIG. 18 is TABLE 4A and 4B which list the aspheric surface data of the second embodiment.

FIG. 19 is TABLE 5 which lists the optical data of the third embodiment.

FIG. 20 is TABLE 6A and 6B which list the aspheric surface data of the third embodiment.

FIG. 21 is TABLE 7 which lists the optical data of the fourth embodiment.

FIG. 22 is TABLE 8A and 8B which list the aspheric surface data of the fourth embodiment.

FIG. 23 is TABLE 9 which lists the optical data of the fifth embodiment.

FIG. 24 is TABLE 10A and 10B which list the aspheric surface data of the fifth embodiment.

FIG. 25 is TABLE 11 which lists the optical data of the sixth embodiment.

FIG. 26 is TABLE 12A and 12B which list the aspheric surface data of the sixth embodiment.

FIG. 27 is TABLE 13 which lists the optical data of the seventh embodiment.

FIG. 28 is TABLE 14A and 14B which list the aspheric surface data of the seventh embodiment.

FIG. 29 is TABLE 15 which lists the data of the respective embodiments resulting from the equations.

DETAILED DESCRIPTION OF THE PREFERRED EMBODIMENTS

Figure 1:
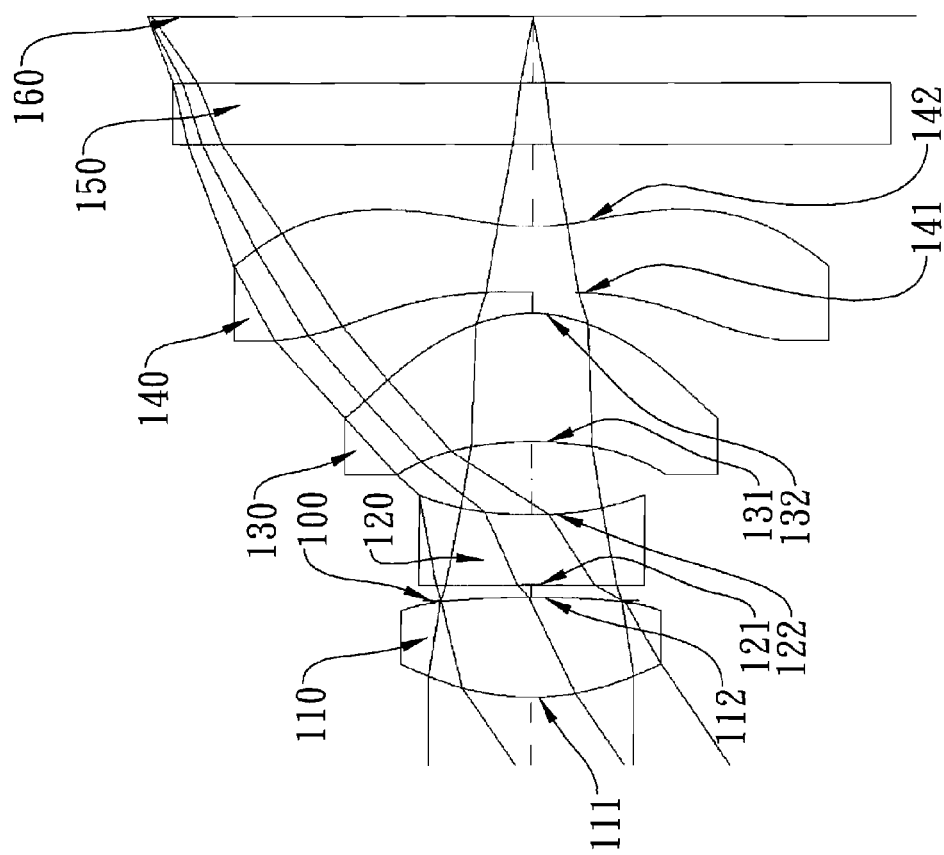
FIG. 1 shows a photographing optical lens assembly in accordance with a first embodiment of the present invention.

The present invention provides a photographing optical lens assembly comprising, in order from an object side to an image side: a first lens element with positive refractive power having a convex object-side surface and a convex image-side surface; a second lens element with negative refractive power having a concave object-side surface and a concave image-side surface; a third lens element with positive refractive power; and a fourth lens element with negative refractive power having a concave image-side surface, both of the object-side and image-side surfaces thereof being aspheric; wherein the photographing optical lens assembly further provides an aperture stop and an electronic sensor, wherein an aperture stop is disposed between the first lens element and the second lens element; wherein the electronic sensor is disposed at the image plane for image formation; wherein there are four lens elements with refractive power in the photographing optical lens assembly; and wherein the focal length of the photographing optical lens assembly is f, the focal length of the first lens element is f1, the focal length of the third lens element is f3, the radius of curvature of the object-side surface of the first lens element is R1, the radius of curvature of the object-side surface of the third lens element is R5, the radius of curvature of the image-side surface of the third lens element is R6, the distance on the optical axis between the aperture stop and the image plane is SL, the distance on the optical axis between the object-side surface of the first lens element and the electronic sensor is TTL, and they satisfy the relations: $-0.27<(f/f1)-(f/f3)<-0.05$; $0.2<R1/f<0.5$; $1.40<R5/R6<4.30$; $0.77<SL/TTL<0.92$.

When (f/f1)−(f/f3) satisfies the aforementioned relation, positive refractive power of the system can be effectively distributed without having too much refractive power from one lens element and can reduce the sensitivity of the system. When R1/f satisfies the aforementioned relation, sufficient positive refractive power is provided for the first lens element while not having too much high order aberration. When R5/R6 satisfies the aforementioned relation, astigmatism of the system is favorably corrected. When SL/TTL satisfies the aforementioned relation, a favorable balance between reducing the track length of the lens assembly and lowering the sensitivity of the system can be achieved.

In the aforementioned photographing optical lens assembly of the present invention, preferably, the third lens element has a concave object-side surface and a convex image-side surface, which can correct the astigmatism of the system; preferably, the fourth lens element has a convex object-side surface and a concave image-side surface, which can correct astigmatism and high order aberration generated in the system.

In the aforementioned photographing optical lens assembly of the present invention, preferably, the fourth lens element is made of plastic material. Plastic lenses can be favorably made into aspheric lenses and reduce cost of production.

In the aforementioned photographing optical lens assembly of the present invention, the focal length of the photographing optical lens assembly is f, the focal length of the first lens element is f1, preferably, satisfy the relation: $1.43<f/f1<2.20$. When f/f1 satisfies the aforementioned relation, the arrangement of the refractive power of the first lens element is more balanced, which can effectively control the total track length of the system and avoid having the high order spherical aberration from becoming too large, in order to improve image quality; furthermore, they preferably satisfy the relation: $1.53<f/f1<2.00$.

In the aforementioned photographing optical lens assembly of the present invention, the Abbe number of the first lens element is V1, the Abbe number of the second lens element is V2, and preferably, they satisfy the relation: $31.0<V1-V2<42.0$. When V1−V2 satisfies the aforementioned relation, the chromatic aberration of the photographing optical lens assembly can be favorably corrected.

In the aforementioned photographing optical lens assembly of the present invention, the radius of curvature of the object-side surface of the third lens element is R5, the radius of curvature of the image-side surface of the third lens element is R6, and preferably, they satisfy the relation: $1.85<R5/R6<3.50$. When R5/R6 satisfies the aforementioned relation, the astigmatism of the system can be favorably corrected.

In the aforementioned photographing optical lens assembly of the present invention, the focal length of the third lens element is f3, the focal length of the fourth lens element is f4, and preferably, they satisfy the relation: $-1.2<f3/f4<-0.8$. When f3/f4 satisfies the aforementioned relation, the telephoto structure formed by the positive power of the third lens element and the negative power of the fourth lens element can be maintained, in order to reduce the total track length of the system.

In the aforementioned photographing optical lens assembly of the present invention, the radius of curvature of the object-side surface of the first lens element is R1, the radius of curvature of the image-side surface of the first lens element is R2, and preferably, they satisfy the relation: $-1.00<R1/R2<-0.05$. When R1/R2 satisfies the aforementioned relation, the spherical aberration of the system can be compensated.

In the aforementioned photographing optical lens assembly of the present invention, the focal length of the photographing optical lens assembly is f, the focal length of the fourth lens element is f4, and preferably, they satisfy the relation: $-2.5<f/f4<-1.5$. When f/f4 satisfies the aforementioned relation, aberration of the third lens element can be effectively corrected for improved image quality of the system.

In the aforementioned photographing optical lens assembly of the present invention, the radius of curvature of the object-side surface of the second lens element is R3, the radius of curvature of the image-side surface of the second lens element is R4, and preferably, they satisfy the relation: $-10.0<R3/R4<-1.0$. When R3/R4 satisfies the aforementioned relation, the second lens element is provided with sufficient negative refractive power in order to correct the chromatic aberration of the system.

In the aforementioned photographing optical lens assembly of the present invention, the distance on the optical axis between the object-side surface of the first lens element and the electronic sensor is TTL, half of the diagonal length of the effective pixel area of the electronic sensor is ImgH, and preferably, they satisfy the relation: TTL/ImgH<2.1. When TTL/ImgH satisfies the aforementioned relation, the photographing optical lens assembly can favorably stay compact in order to be equipped on the light weight and compact electronic products.

According to another aspect of the present invention, a photographing optical lens assembly, in order of an object side surface to an image-side surface, comprises: a first lens element with positive refractive power having a convex object-side surface and a convex image-side surface; a second lens element with negative refractive power having a concave image-side surface; a third lens element with positive refractive power having a concave object-side surface and a convex image-side surface, at least one of the object-side and image-side surfaces thereof being aspheric; and a fourth lens element with negative refractive power having a concave image-side surface, both of the object-side and image-side surfaces thereof being aspheric, at least one inflection point formed on the object-side and image-side surfaces; wherein the photographing optical lens assembly further provides an aperture stop and an electronic sensor; wherein the aperture stop is disposed between the first lens element and the second lens element; wherein the electronic sensor is provided at the image plane for image formation; wherein there are four lens elements with refractive power in the photographing optical lens assembly; and wherein the focal length of the photographing optical lens assembly is f, the focal length of the first lens element is f1, the focal length of the third lens element is f3, the Abbe number of the first lens element is V1, the Abbe number of the second lens element is V2, the radius of curvature of the object-side surface of the first lens element is R1, the radius of curvature of the image-side surface of the first lens element is R2, the radius of curvature of the object-side surface of the third lens element is R5, the radius of curvature of the image-side surface of the third lens element is R6, the distance on the optical axis between the object-side surface of the first lens element and the electronic sensor is TTL, the distance on the optical axis between the aperture stop and the image plane is SL, half of the diagonal length of the effective pixel area of the electronic sensor is ImgH, and they satisfy the relations: $-0.27<(f/f1)-(f/f3)<-0.05$; $31.0<V1-V2<42.0$; $-2.00<R1/R2<-0.01$; $1.40<R5/R6<4.30$; $0.77<SL/TTL<0.92$; $TTL/ImgH<1.95$.

When $(f/f1)-(f/f3)$ satisfies the aforementioned relation, positive refractive power of the system can be effectively distributed without having too much refractive power from one lens element and the sensitivity of the system can be reduced favorably. When V1−V2 satisfies the aforementioned relation, chromatic aberration of the photographing optical lens assembly can be favorably corrected. When R1/R2 satisfies the aforementioned relation, spherical aberration of the system can be favorably compensated; furthermore, preferably, it satisfies the relation: $-1.00<R1/R2<-0.05$. When R5/R6 satisfies the aforementioned relation, astigmatism of the system can be favorably corrected. When SL/TTL satisfies the aforementioned relation, a favorable balance can be achieved between reducing the track length of the assembly and lowering the sensitivity of the system. When TTL/ImgH satisfies the aforementioned relation, the photographing optical lens assembly can favorably maintain its compact size in order to be equipped on light weight and compact electronic products.

In the aforementioned photographing optical lens element of the present invention, preferably, the fourth lens element has a convex object-side surface and a concave image-side surface which corrects the astigmatism and high order aberration of the system.

In the aforementioned photographing optical lens element of the present invention, the focal length of the third lens element is f3, the focal length of the fourth lens element is f4, and preferably, they satisfy the relation: $-1.2<f3/f4<-0.8$. When f3/f4 satisfies the aforementioned relation, the telephoto structure formed by the positive power of the third lens element and the negative power of the fourth lens element can be maintained, in order to reduce the total track length of the system.

In the aforementioned photographing optical lens element of the present invention, the distance on the optical axis between the first lens element and the second lens element is T12, the focal length of the photographing optical lens assembly is f, and preferably, they satisfy the relation: $0.5<(T12/f)*100<4.0$. When T12/f satisfies the aforementioned relation, sufficient space for placing the aperture stop between the first lens element and the second lens element can be ensured and such arrange is favorable for correcting high order aberration of the system.

In the aforementioned photographing optical lens element of the present invention, the radius of curvature of the image-side surface of the fourth lens element is R8, the focal length of the photographing optical lens assembly is f, and preferably, they satisfy the relation: $0.20<R8/f<0.35$. When R8/f satisfies the aforementioned relation, the back focal distance of the system can be reduced in order to reduce the total track length of the photographing optical lens assembly.

In the aforementioned photographing optical lens element of the present invention, the radius of curvature of the object-side surface of the second lens element is R3, the radius of curvature of the image-side surface of the second lens element is R4, and preferably, they satisfy the relation: $-10.0<R3/R4<-1.0$. When R3/R4 satisfies the aforementioned relation, the second lens element is provided with sufficient negative refractive power in order to correct the chromatic aberration.

In the aforementioned photographing optical lens element of the present invention, the focal length of the photographing optical lens assembly is f, the focal length of the fourth lens element is f4, and preferably, they satisfy the relation: $-2.5<f/f4<-1.5$. When f/f4 satisfies the aforementioned relation, aberration generated from the third lens element can be effectively corrected and image quality of the system can improve.

In the aforementioned photographing optical lens element of the present invention, the focal length of the photographing optical lens assembly is f, the focal length of the first lens element is f1, and preferably, they satisfy the relation: $1.53<f/f1<2.00$. When f/f1 satisfies the aforementioned relation, the refractive power distribution of the first lens element is more balanced, the total track length of the system can be effectively controlled, and high spherical aberration can be prevented from becoming too large, in order to improve image quality.

According to another aspect of the present invention, a photographing optical lens assembly, in order of an object side surface to an image-side surface, comprises: a first lens element with positive refractive power having a convex object-side surface; a second lens element with negative refractive power having a concave image-side surface; a third lens element with positive refractive power having a concave object-side surface and a convex image-side surface, at least one of the object-side and image-side surfaces thereof being aspheric; and a fourth lens element with negative refractive power having a concave image-side surface, both of the object-side and image-side surfaces thereof being aspheric, at least one inflection point formed on the object-side and image-side surfaces; wherein the photographing optical lens assembly further provides an aperture stop and an electronic sensor; wherein the aperture stop is disposed between the first lens element and the second lens element; wherein the electronic sensor is disposed at the image plane for image formation; wherein there are four lens elements with refractive power in the photographing optical lens assembly; and wherein the focal length of the photographing optical lens assembly is f, the focal length of the fourth lens element is f4, the radius of curvature of the object-side surface of the third lens element is R5, the radius of curvature of the image-side surface of the third lens element is R6, the Abbe number of the first lens element is V1, the Abbe number of the second lens element is V2, the distance on the optical axis between the aperture stop and the image plane is SL, the distance on the optical axis between the object-side surface of the first lens element and the electronic sensor is TTL, and they satisfy the relations: −2.5<f/f4<−1.5; 2.0<(R5+R6)/(R5−R6)<5.0; 31.0<V1−V2<42.0; 0.77<SL/TTL<0.92

When f/f4 satisfies the aforementioned relation, aberration of the third lens element can be effectively corrected for improved image quality of the system; preferably, it satisfies the relation: −2.2<f/f4<−1.8. When (R5+R6)/(R5−R6) satisfies the aforementioned relation, the shape of the third lens element can be controlled in order to correct off-axis aberration; preferably, it satisfies the relation: 2.2<(R5+R6)/(R5−R6)<2.8. When V1−V2 satisfies the aforementioned relation, chromatic aberration of the photographing optical lens assembly can be favorably corrected. When SL/TTL satisfies the aforementioned relation, a favorable balance between reducing the track length of the lens assembly and lowering the sensitivity of the system can be achieved.

In the aforementioned photographing optical lens element of the present invention, preferably, when the object-side surface of the fourth lens element is concave, the principal point of the optical system can be further away from the image plane, which reduces the total track length of the system in order for the system to stay compact; preferably, when the object-side surface of the second lens element is concave, Petzval Sum of the system can be effectively corrected and the back focal distance of the system can be enlarged to obtain enough back focal distance for placing other components in the photographing optical lens assembly.

In the aforementioned photographing optical lens assembly of the present invention, the distance on the optical axis between the first element and the second lens element is T12, the focal length of the photographing optical lens assembly is f, and they preferably satisfy the relation: 0.5<(T12/f)*100<4.0. When T12/f satisfies the aforementioned relation, sufficient space for placing the aperture stop between the first lens element and the second lens element can be ensured and such arrange is favorable for correcting high order aberration of the system.

In the present photographing optical lens assembly, the lens elements can be made of glass or plastic material. If the lens elements are made of glass, there is more freedom in distributing the refractive power of the system. If the lens elements are made of plastic, the manufacturing cost will be reduced effectively. Furthermore, the surfaces of the lens elements can be made into aspheric surfaces. Aspheric surfaces can be easily made into non-spherical profiles, allowing more design parameter freedom which can be used to reduce aberrations and the number of the lens elements, and the total track length of the photographing optical lens assembly can be effectively reduced.

In the present photographing optical lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 2:
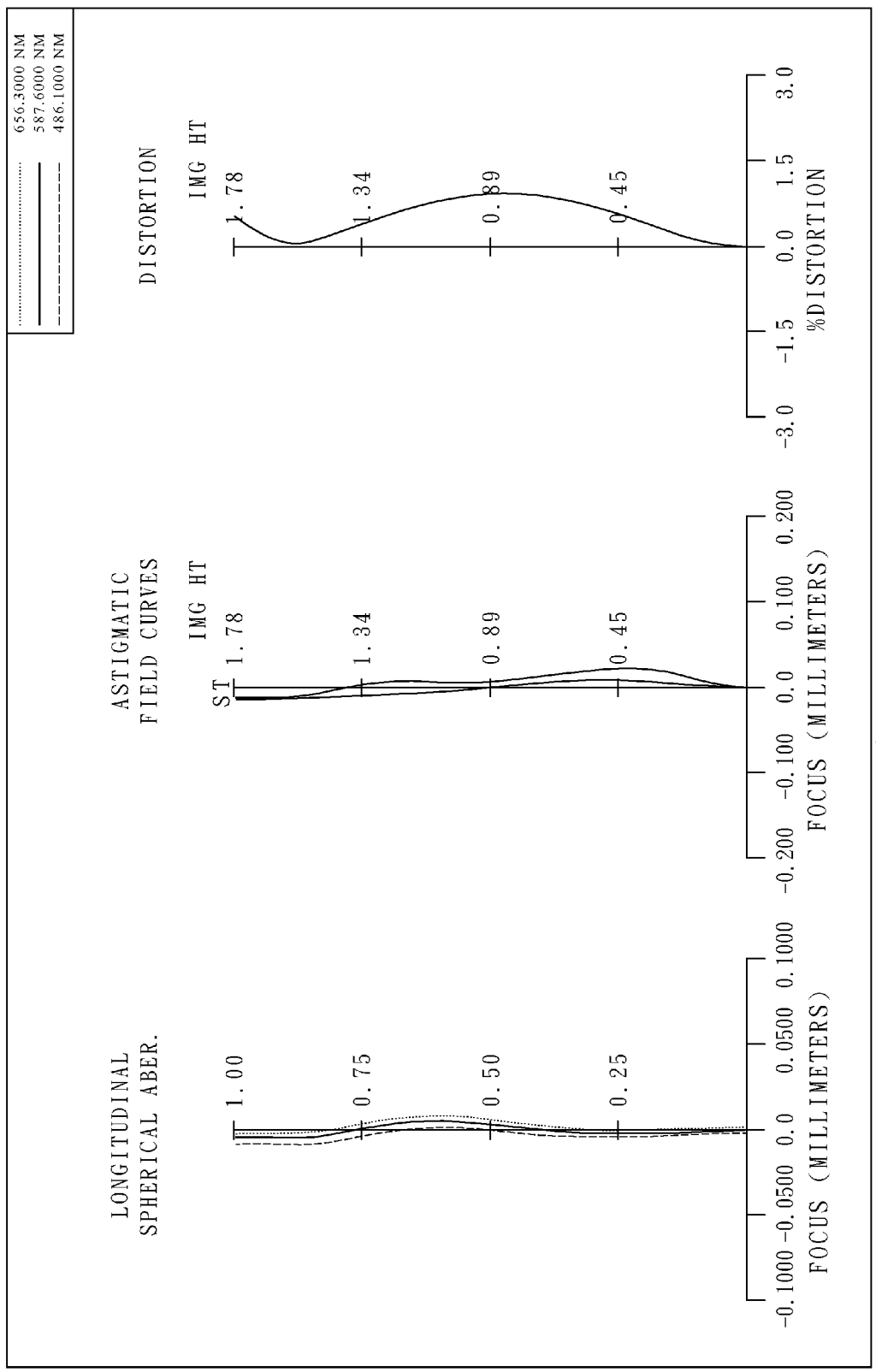
FIG. 2 shows the aberration curves of the first embodiment of the present invention.

FIG. 1 shows a photographing optical lens assembly in accordance with a first embodiment of the present invention, and FIG. 2 shows the aberration curves of the first embodiment of the present invention. The photographing optical lens assembly of the first embodiment of the present invention mainly comprises four lens elements, in order from an object side to an image side: a plastic first lens element 110 with positive refractive power having a convex object-side surface 111 and a convex image-side surface 112, the object-side and image-side surfaces 111 and 112 thereof being aspheric; a plastic second lens element 120 with negative refractive power having a concave object-side surface 121 and a concave image-side surface 122, the object-side and image-side surfaces 121 and 122 thereof being aspheric; a plastic third lens element 130 with positive refractive power having a convex object-side surface 131 and a convex image-side surface 132, both of the object-side and image-side surfaces 131 and 132 thereof being aspheric; a plastic fourth lens element 140 with negative refractive power having a concave object-side surface 141 and a concave image-side surface 142, both of the object-side and image-side surfaces 141 and 142 thereof being aspheric, at least one inflection point formed on the object-side surface 141 and the image-side surface 142; and wherein an aperture stop 100 is disposed between the first lens element 110 and the second lens element 120; wherein an IR filter 150 is disposed between the image-side surface 142 of the fourth lens element 140 and the image plane 160; and wherein the IR filter 150 is made of glass and has no influence on the focal length of the photographing optical lens assembly.

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing optical lens assembly, the focal length of the photographing optical lens assembly is f, and it satisfies the relation: f=2.72 (mm).

In the first embodiment of the present photographing optical lens assembly, the f-number of the photographing optical lens assembly is Fno, and it satisfies the relation: Fno=2.85.

In the first embodiment of the present photographing optical lens assembly, half of the maximal field of view of the photographing optical lens assembly is HFOV, and it satisfies the relation: HFOV=33.1 deg.

In the first embodiment of the present photographing optical lens assembly, the Abbe number of the first lens element 110 is V1, the Abbe number of the second lens element 120 is V2, and they satisfy the relation: V1−V2=32.5.

In the first embodiment of the present photographing optical lens assembly, the distance on the optical axis between the first lens element 110 and the second lens element 120 is T12, the focal length of the photographing optical lens assembly is f, and they satisfy the relation: (T12/f)*100=2.2.

In the first embodiment of the present photographing optical lens assembly, the radius of curvature of the object-side surface 111 of the first lens element 110 is R1, the radius of curvature of the image-side surface 112 of the first lens element 110 is R2, and they satisfy the relation: R1/R2=−0.31.

In the first embodiment of the present photographing optical lens assembly, the radius of curvature of the object-side surface 121 of the second lens element 120 is R3, the radius of curvature of the image-side surface 122 of the second lens element 120 is R4, and they satisfy the relation: R3/R4=−5.26.

In the first embodiment of the present photographing optical lens assembly, the radius of curvature of the object-side surface 131 of the third lens element 130 is R5, the radius of curvature of the image-side surface 132 of the third lens element 130 is R6, and they satisfy the relations: R5/R6=2.82; and (R5+R6)/(R5−R6)=2.10.

In the first embodiment of the present photographing optical lens assembly, the radius of curvature of the object-side surface 111 of the first lens element 110 is R1, the focal length of the photographing optical lens assembly is f, and they satisfy the relation: R1/f=0.41.

In the first embodiment of the present photographing optical lens assembly, the radius of curvature of the image-side surface 142 of the first lens element 140 is R8, the focal length of the photographing optical lens assembly is f, and they satisfy the relation: R8/f=0.35.

In the first embodiment of the present photographing optical lens assembly, the focal length of the photographing optical lens assembly is f, the focal length of the first lens element 110 is f1, and they satisfy the relation: f/f1=1.68.

In the first embodiment of the present photographing optical lens assembly, the focal length of the photographing optical lens assembly is f, the focal length of the fourth lens element 140 is f4, and they satisfy the relation: f/f4=0.80.

In the first embodiment of the present photographing optical lens assembly, the focal length of the third lens element 130 is f3, the focal length of the fourth lens element 140 is f4, and they satisfy the relation: f3/f4=−0.97.

In the first embodiment of the present photographing optical lens assembly, the focal length of the photographing optical lens assembly is f, the focal length of the first lens element 110 is f1, the focal length of the third lens element 130 is f3, and they satisfy the relation: (f/f1)−(f/f3)=−0.17.

In the first embodiment of the present photographing optical lens assembly, the photographing optical lens assembly further provides an electronic sensor at the image plane 160 for image formation; wherein the distance on the optical axis between the aperture stop 100 and the image plane 160 is SL, the distance on the optical axis between the object-side surface 111 of the first lens element 110 and the electronic sensor is TTL, and they satisfy the relation: SL/TTL=0.85. Furthermore, half of the diagonal length of the effective pixel area of the electronic sensor is ImgH, and they satisfy the relation: TTL/ImgH=1.80.

The detailed optical data of the first embodiment is shown in FIG. 15 (TABLE 1), and the aspheric surface data is shown in FIG. 16 (TABLE 2), wherein the units of the radius of curvature, the thickness and the focal length are expressed in mm, and HFOV is half of the maximal field of view.

Figure 3:
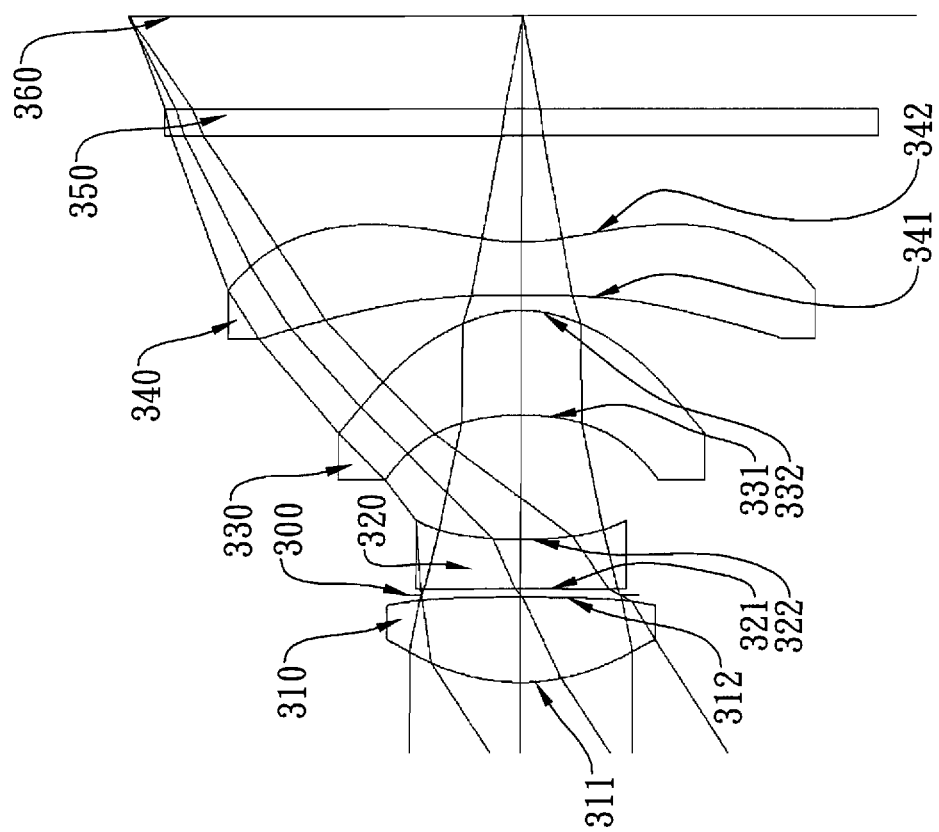
FIG. 3 shows a photographing optical lens assembly in accordance with a second embodiment of the present invention.
Figure 4:
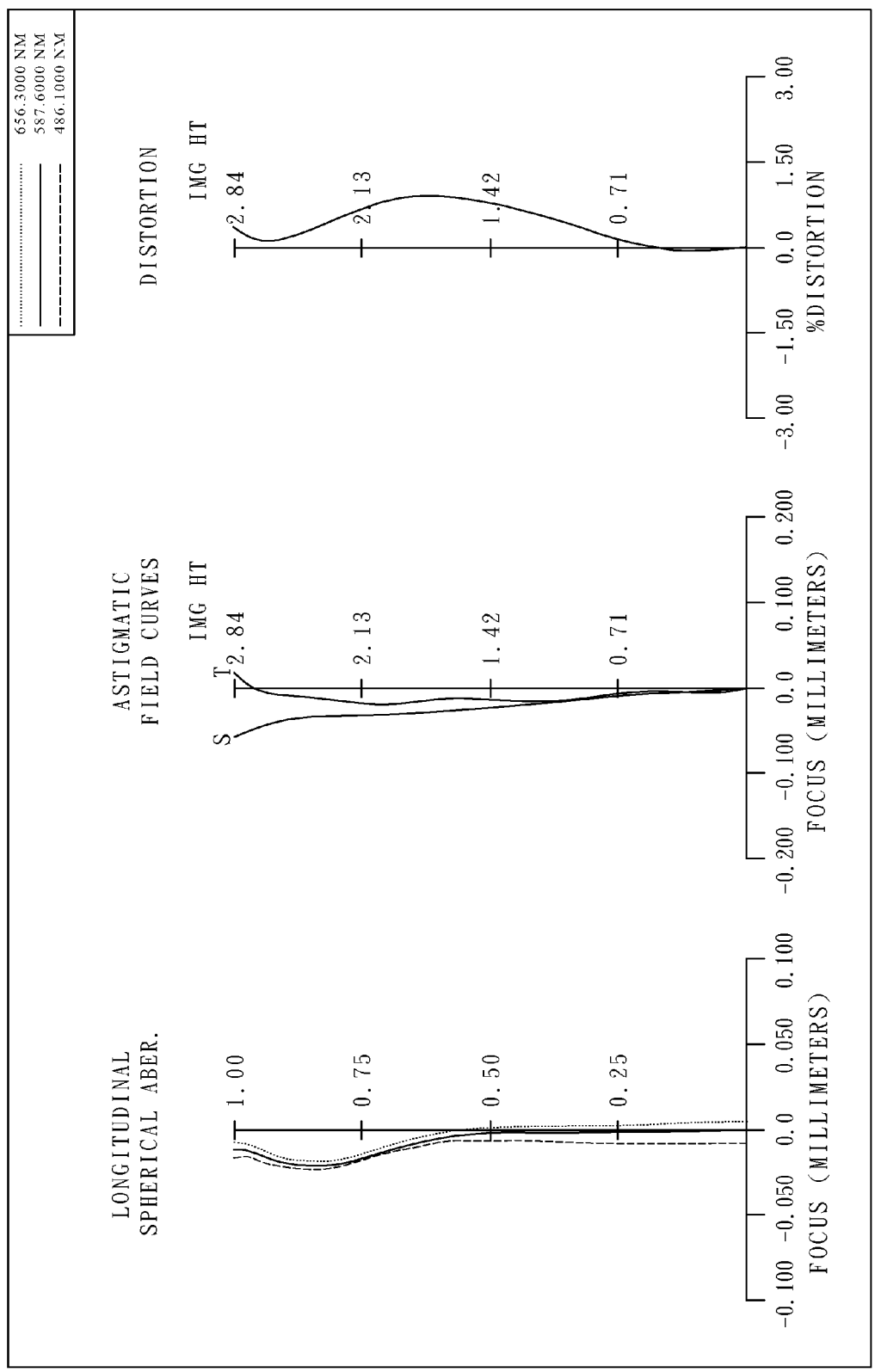
FIG. 4 shows the aberration curves of the second embodiment of the present invention.

FIG. 3 shows a photographing optical lens assembly in accordance with a second embodiment of the present invention, and FIG. 4 shows the aberration curves of the second embodiment of the present invention. The photographing optical lens assembly of the second embodiment of the present invention mainly comprises four lens elements, in order from the object side to the image side: a plastic first lens element 310 with positive refractive power having a convex object-side surface 311 and a convex image-side surface 312, the object-side and image-side surfaces 311 and 312 thereof being aspheric; a plastic second lens element 320 with negative refractive power having a concave object-side surface 321 and a concave image-side surface 322, the object-side and image-side surfaces 321 and 322 thereof being aspheric; a plastic third lens element 330 with positive refractive power having a concave object-side surface 331 and a convex image-side surface 332, the object-side and image-side surfaces 331 and 332 thereof being aspheric; a plastic fourth lens element 340 with negative refractive power having a concave object-side surface 341 and a concave image-side surface 342, the object-side and image-side surfaces 341 and 342 thereof being aspheric, at least one inflection point formed on the object side surface 341 and the image-side surface 342; and wherein an aperture stop 300 is disposed between the first lens element 310 and the second lens element 320; wherein an IR filter 350 is disposed between the image-side surface 342 of the fourth lens element 340 and the image plane 360; and wherein the IR filter 350 is made of glass and has no influence on the focal length of the photographing optical lens assembly.

The equation of the aspheric surface profiles of the second embodiment has the same form as that of the first embodiment.

In the second embodiment of the present photographing optical lens assembly, the focal length of the photographing optical lens assembly is f, and it satisfies the relation: f=4.57 (mm).

In the second embodiment of the present photographing optical lens assembly, the f-number of the photographing optical lens assembly is Fno, and it satisfies the relation: Fno=2.85.

In the second embodiment of the present photographing optical lens assembly, half of the maximal field of view of the photographing optical lens assembly is HFOV, and it satisfies the relation: HFOV=31.8 deg.

In the second embodiment of the present photographing optical lens assembly, the Abbe number of the first lens element 310 is V1, the Abbe number of the second lens element 320 is V2, and they satisfy the relation: V1−V2=32.5.

In the second embodiment of the present photographing optical lens assembly, the distance on the optical axis between the first lens element 310 and the second lens element 320 is T12, the focal length of the photographing optical lens assembly is f, and they satisfy the relation: (T12/f)*100=1.4.

In the second embodiment of the present photographing optical lens assembly, the radius of curvature of the object-side surface 311 of the first lens element 310 is R1, the radius of curvature of the image-side surface 312 of the first lens element 310 is R2, and they satisfy the relation: R1/R2=−0.06.

In the second embodiment of the present photographing optical lens assembly, the radius of curvature of the object-side surface 321 of the second lens element 320 is R3, the radius of curvature of the image-side surface 322 of the second lens element 320 is R4, and they satisfy the relation: R3/R4=−8.17.

In the second embodiment of the present photographing optical lens assembly, the radius of curvature of the object-side surface 331 of the third lens element 330 is R5, the radius of curvature of the image-side surface 332 of the third lens element 330 is R6, and they satisfy the relations: R5/R6=1.98; and (R5+R6)/(R5−R6)=3.05.

In the second embodiment of the present photographing optical lens assembly, the radius of curvature of the object-side surface 311 of the first lens element 310 is R1, the focal length of the photographing optical lens assembly is f, and they satisfy the relation: R1/f=0.32.

In the second embodiment of the present photographing optical lens assembly, the radius of curvature of the image-side surface 342 of the first lens element 340 is R8, the focal length of the photographing optical lens assembly is f, and they satisfy the relation: R8/f=0.29.

In the second embodiment of the present photographing optical lens assembly, the focal length of the photographing optical lens assembly is f, the focal length of the first lens element 310 is f1, and they satisfy the relation: f/f1=1.81.

In the second embodiment of the present photographing optical lens assembly, the focal length of the photographing optical lens assembly is f, the focal length of the fourth lens element 340 is f4, and they satisfy the relation: f/f4=−2.00.

In the second embodiment of the present photographing optical lens assembly, the focal length of the third lens element 330 is f3, the focal length of the fourth lens element 340 is f4, and they satisfy the relation: f3/f4=−0.99.

In the second embodiment of the present photographing optical lens assembly, the focal length of the photographing optical lens assembly is f, the focal length of the first lens element 310 is f1, the focal length of the third lens element 330 is f3, and they satisfy the relation: (f/f1)−(f/f3)=−0.19.

In the second embodiment of the present photographing optical lens assembly, the photographing optical lens assembly further provides an electronic sensor at the image plane 360 for image formation; wherein the distance on the optical axis between the aperture stop 300 and the image plane 360 is SL, the distance on the optical axis between the object-side surface 311 of the first lens element 310 and the electronic sensor is TTL, and they satisfy the relation: SL/TTL=0.87. Furthermore, half of the diagonal length of the effective pixel area of the electronic sensor is ImgH, and they satisfy the relation: TTL/ImgH=1.75.

The detailed optical data of the second embodiment is shown in FIG. 17 (TABLE 3), and the aspheric surface data is shown in FIG. 18 (TABLES 4A and 4B), wherein the units of the radius of curvature, the thickness and the focal length are expressed in mm, and HFOV is half of the maximal field of view.

Figure 5:
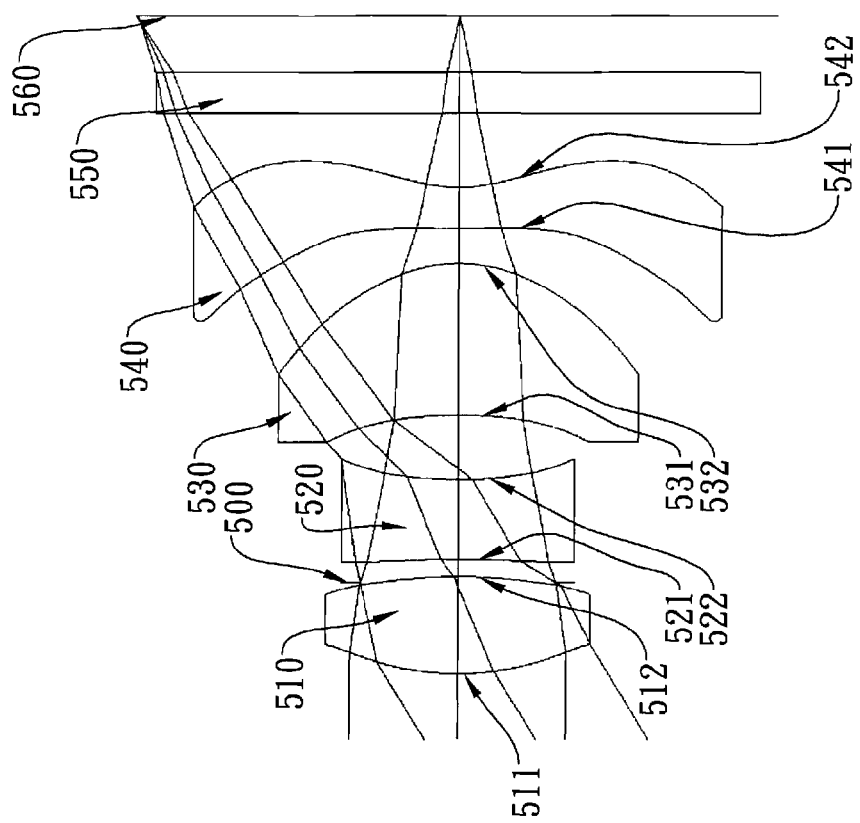
FIG. 5 shows a photographing optical lens assembly in accordance with a third embodiment of the present invention.
Figure 6:
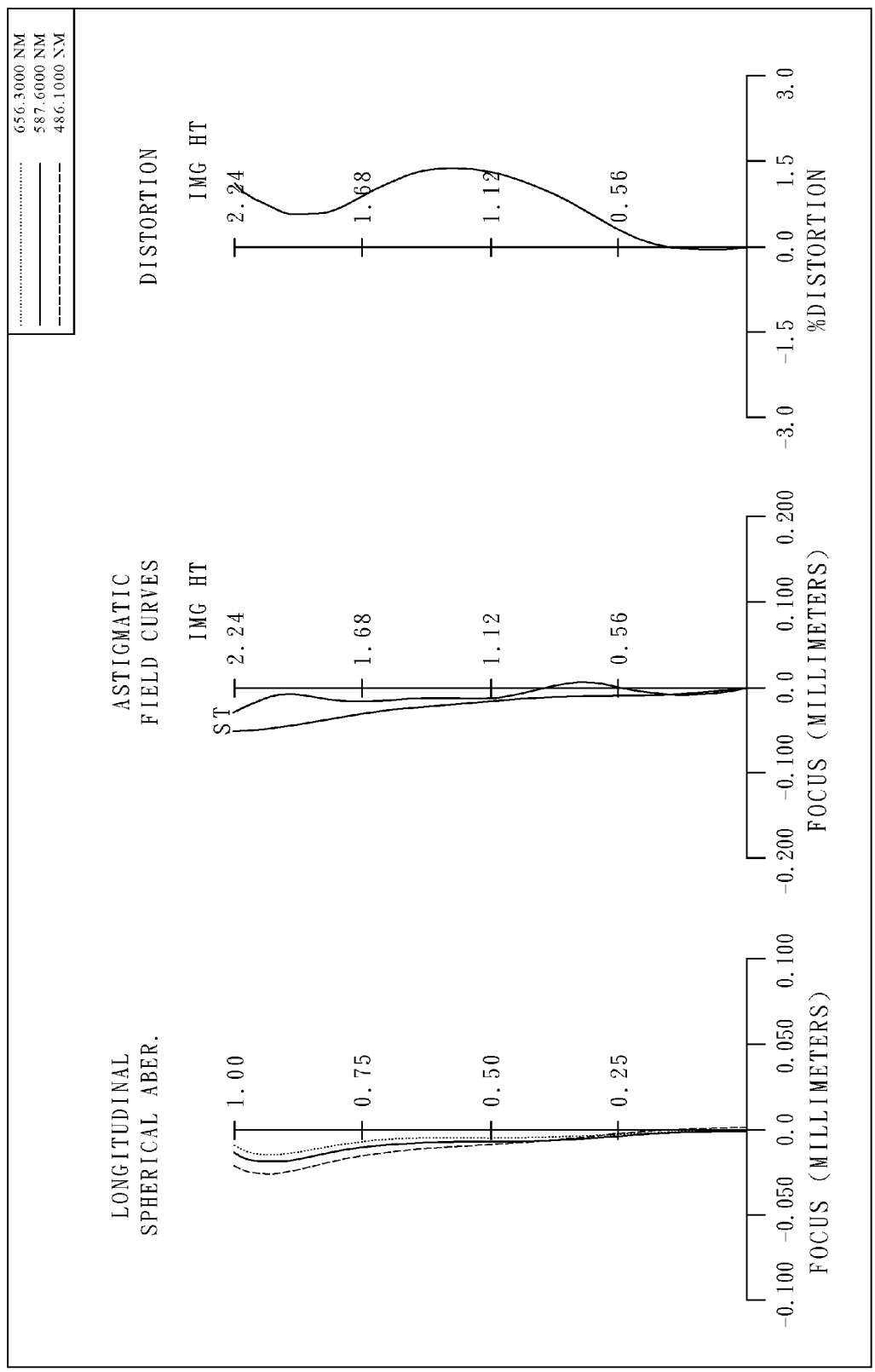
FIG. 6 shows the aberration curves of the third embodiment of the present invention.

FIG. 5 shows a photographing optical lens assembly in accordance with a third embodiment of the present invention, and FIG. 6 shows the aberration curves of the third embodiment of the present invention. The photographing optical lens assembly of the third embodiment of the present invention mainly comprises four lens elements, in order from the object side to the image side: a plastic first lens element 510 with positive refractive power having a convex object-side surface 511 and a convex image-side surface 512, the object-side and image-side surfaces 511 and 512 thereof being aspheric; a plastic second lens element 520 with negative refractive power having a concave object-side surface 521 and a concave image-side surface 522, the object-side and image-side surfaces 521 and 522 thereof being aspheric; a plastic third lens element 530 with positive refractive power having a concave object-side surface 531 and a convex image-side surface 532, the object-side and image-side surfaces 531 and 532 thereof being aspheric; a plastic fourth lens element 540 with negative refractive power having a convex object-side surface 541 and a concave image-side surface 542, the object-side and image-side surfaces 541 and 542 thereof being aspheric, at least one inflection point formed on the object-side surface 541 and the image-side surface 542; and wherein an aperture stop 500 is disposed between the first lens element 510 and the second lens element 520; wherein an IR filter 550 is disposed between the image-side surface 542 of the fourth lens element 540 and the image plane 560; and wherein the IR filter 550 is made of glass and has no influence on the focal length of the photographing optical lens assembly.

The equation of the aspheric surface profiles of the third embodiment has the same form as that of the first embodiment.

In the third embodiment of the present photographing optical lens assembly, the focal length of the photographing optical lens assembly is f, and it satisfies the relation: f=3.76 (mm).

In the third embodiment of the present photographing optical lens assembly, the f-number of the photographing optical lens assembly is Fno, and it satisfies the relation: Fno=2.50.

In the third embodiment of the present photographing optical lens assembly, half of the maximal field of view of the photographing optical lens assembly is HFOV, and it satisfies the relation: HFOV=30.6 deg.

In the third embodiment of the present photographing optical lens assembly, the Abbe number of the first lens element 510 is V1, the Abbe number of the second lens element 520 is V2, and they satisfy the relation: V1−V2=32.5.

In the third embodiment of the present photographing optical lens assembly, the distance on the optical axis between the first lens element 510 and the second lens element 520 is T12, the focal length of the photographing optical lens assembly is f, and they satisfy the relation: (T12/f)*100=3.3.

In the third embodiment of the present photographing optical lens assembly, the radius of curvature of the object-side surface 511 of the first lens element 510 is R1, the radius of curvature of the image-side surface 512 of the first lens element 510 is R2, and they satisfy the relation: R1/R2=−0.58.

In the third embodiment of the present photographing optical lens assembly, the radius of curvature of the object-side surface 521 of the second lens element 520 is R3, the radius of curvature of the image-side surface 522 of the second lens element 520 is R4, and they satisfy the relation: R3/R4=−1.32.

In the third embodiment of the present photographing optical lens assembly, the radius of curvature of the object-side surface 531 of the third lens element 530 is R5, the radius of curvature of the image-side surface 532 of the third lens element 530 is R6, and they satisfy the relations: R5/R6=3.27; and (R5+R6)/(R5−R6)=1.88.

In the third embodiment of the present photographing optical lens assembly, the radius of curvature of the object-side surface 511 of the first lens element 510 is R1, the focal length of the photographing optical lens assembly is f, and they satisfy the relation: R1/f=0.48.

In the third embodiment of the present photographing optical lens assembly, the radius of curvature of the image-side surface 542 of the first lens element 540 is R8, the focal length of the photographing optical lens assembly is f, and they satisfy the relation: R8/f=0.26.

In the third embodiment of the present photographing optical lens assembly, the focal length of the photographing optical lens assembly is f, the focal length of the first lens element 510 is f1, and they satisfy the relation: f/f1=1.72.

In the third embodiment of the present photographing optical lens assembly, the focal length of the photographing optical lens assembly is f, the focal length of the fourth lens element 540 is f4, and they satisfy the relation: f/f4=−1.83.

In the third embodiment of the present photographing optical lens assembly, the focal length of the third lens element 530 is f3, the focal length of the fourth lens element 540 is f4, and they satisfy the relation: f3/f4=−1.00.

In the third embodiment of the present photographing optical lens assembly, the focal length of the photographing optical lens assembly is f, the focal length of the first lens element 510 is f1, the focal length of the third lens element 530 is f3, and they satisfy the relation: (f/f1)−(f/f3)=−0.12.

In the third embodiment of the present photographing optical lens assembly, the photographing optical lens assembly further provides an electronic sensor at the image plane 560 for image formation; wherein the distance on the optical axis between the aperture stop 500 and the image plane 560 is SL, the distance on the optical axis between the object-side surface 511 of the first lens element 510 and the electronic sensor is TTL, and they satisfy the relation: SL/TTL=0.86. Furthermore, half of the diagonal length of the effective pixel area of the electronic sensor is ImgH, and they satisfy the relation: TTL/ImgH=2.08.

The detailed optical data of the third embodiment is shown in FIG. 19 (TABLE 5), and the aspheric surface data is shown in FIG. 20 (TABLES 6A and 6B), wherein the units of the radius of curvature, the thickness and the focal length are expressed in mm, and HFOV is half of the maximal field of view.

Figure 7:
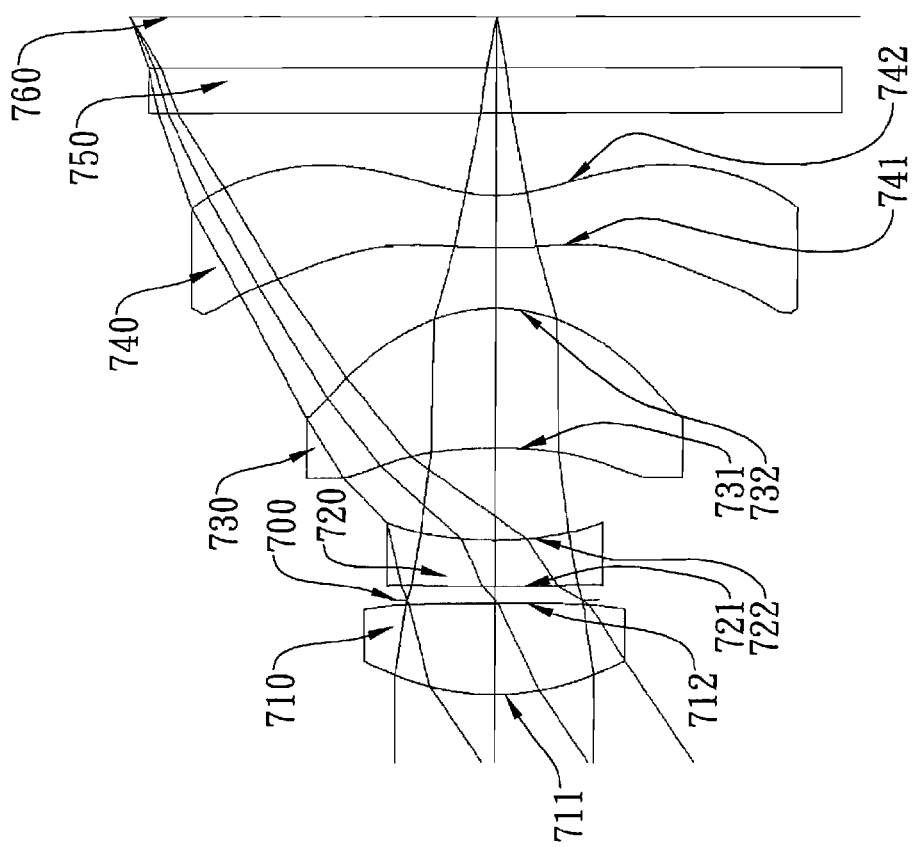
FIG. 7 shows a photographing optical lens assembly in accordance with a fourth embodiment of the present invention.
Figure 8:
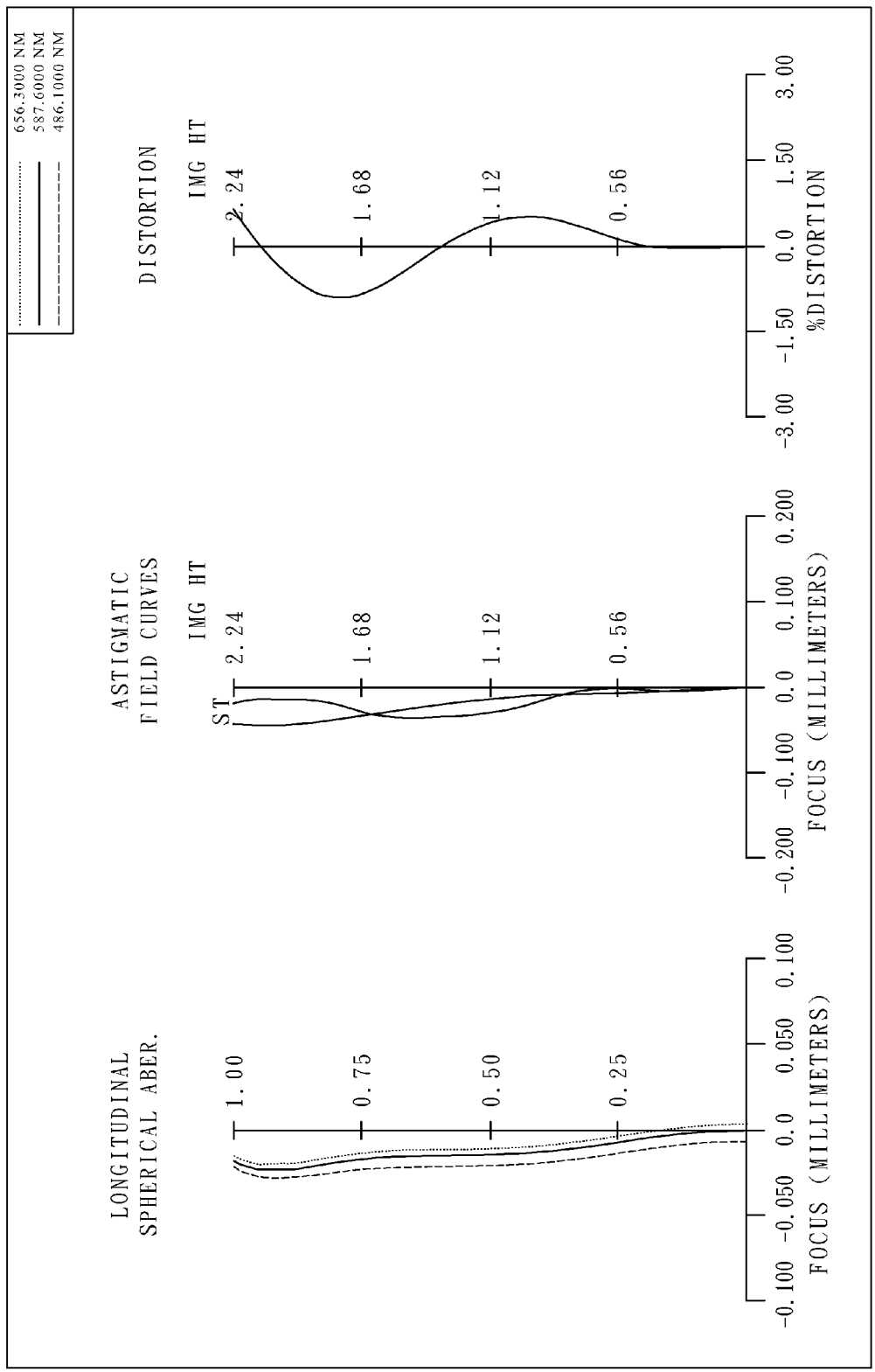
FIG. 8 shows the aberration curves of the fourth embodiment of the present invention.

FIG. 7 shows a photographing optical lens assembly in accordance with a fourth embodiment of the present invention, and FIG. 8 shows the aberration curves of the fourth embodiment of the present invention. The photographing optical lens assembly of the fourth embodiment of the present invention mainly comprises four lens elements, in order from the object side to the image side: a plastic first lens element 710 with positive refractive power having a convex object-side surface 711 and a convex image-side surface 712, the object-side and image-side surfaces 711 and 712 thereof being aspheric; a plastic second lens element 720 with negative refractive power having a convex object-side surface 721 and a concave image-side surface 722, the object-side and image-side surfaces 721 and 722 thereof being aspheric; a plastic third lens element 730 with positive refractive power having a concave object-side surface 731 and a convex image-side surface 732, the object-side and image-side surfaces 731 and 732 thereof being aspheric; a plastic fourth lens element 740 with negative refractive power having a convex object-side surface 741 and a concave image-side surface 742, the object-side and image-side surfaces 741 and 742 thereof being aspheric, at least one inflection point formed on the object-side surface 741 and the image-side surface 742; and wherein an aperture stop 700 is disposed between the first lens element 710 and the second lens element 720; wherein an IR filter 750 is disposed between the image-side surface 742 of the fourth lens element 740 and the image plane 760; and wherein the IR filter 750 is made of glass and has no influence on the focal length of the photographing optical lens assembly.

The equation of the aspheric surface profiles of the fourth embodiment has the same form as that of the first embodiment.

In the fourth embodiment of the present photographing optical lens assembly, the focal length of the photographing optical lens assembly is f, and it satisfies the relation: f=3.42 (mm).

In the fourth embodiment of the present photographing optical lens assembly, the f-number of the photographing optical lens assembly is Fno, and it satisfies the relation: Fno=2.80.

In the fourth embodiment of the present photographing optical lens assembly, half of the maximal field of view of the photographing optical lens assembly is HFOV, and it satisfies the relation: HFOV=33.0 deg.

In the fourth embodiment of the present photographing optical lens assembly, the Abbe number of the first lens element 710 is V1, the Abbe number of the second lens element 720 is V2, and they satisfy the relation: V1−V2=32.5.

In the fourth embodiment of the present photographing optical lens assembly, the distance on the optical axis between the first lens element 710 and the second lens element 720 is T12, the focal length of the photographing optical lens assembly is f, and they satisfy the relation: (T12/f)*100=3.1.

In the fourth embodiment of the present photographing optical lens assembly, the radius of curvature of the object-side surface 711 of the first lens element 710 is R1, the radius of curvature of the image-side surface 712 of the first lens element 710 is R2, and they satisfy the relation: R1/R2=−0.09.

In the fourth embodiment of the present photographing optical lens assembly, the radius of curvature of the object-side surface 721 of the second lens element 720 is R3, the radius of curvature of the image-side surface 722 of the second lens element 720 is R4, and they satisfy the relation: R3/R4=4.53.

In the fourth embodiment of the present photographing optical lens assembly, the radius of curvature of the object-side surface 731 of the third lens element 730 is R5, the radius of curvature of the image-side surface 732 of the third lens element 730 is R6, and they satisfy the relations: R5/R6=2.81; and (R5+R6)/(R5−R6)=2.10.

In the fourth embodiment of the present photographing optical lens assembly, the radius of curvature of the object-side surface 711 of the first lens element 710 is R1, the focal length of the photographing optical lens assembly is f, and they satisfy the relation: R1/f=0.46.

In the fourth embodiment of the present photographing optical lens assembly, the radius of curvature of the image-side surface 742 of the first lens element 740 is R8, the focal length of the photographing optical lens assembly is f, and they satisfy the relation: R8/f=0.27.

In the fourth embodiment of the present photographing optical lens assembly, the focal length of the photographing optical lens assembly is f, the focal length of the first lens element 710 is f1, and they satisfy the relation: f/f1=1.28.

In the fourth embodiment of the present photographing optical lens assembly, the focal length of the photographing optical lens assembly is f, the focal length of the fourth lens element 740 is f4, and they satisfy the relation: f/f4=−1.45.

In the fourth embodiment of the present photographing optical lens assembly, the focal length of the third lens element 730 is f3, the focal length of the fourth lens element 740 is f4, and they satisfy the relation: f3/f4=−0.96.

In the fourth embodiment of the present photographing optical lens assembly, the focal length of the photographing optical lens assembly is f, the focal length of the first lens element 710 is f1, the focal length of the third lens element 730 is f3, and they satisfy the relation: (f/f1)−(f/f3)=−0.24.

In the fourth embodiment of the present photographing optical lens assembly, the photographing optical lens assembly further provides an electronic sensor at the image plane 760 for image formation; wherein the distance on the optical axis between the aperture stop 700 and the image plane 760 is SL, the distance on the optical axis between the object-side surface 711 of the first lens element 710 and the electronic sensor is TTL, and they satisfy the relation: SL/TTL=0.86. Furthermore, half of the diagonal length of the effective pixel area of the electronic sensor is ImgH, and they satisfy the relation: TTL/ImgH=1.92.

The detailed optical data of the fourth embodiment is shown in FIG. 21 (TABLE 7), and the aspheric surface data is shown in FIG. 22 (TABLES 8A and 8B), wherein the units of the radius of curvature, the thickness and the focal length are expressed in mm, and HFOV is half of the maximal field of view.

Figure 9:
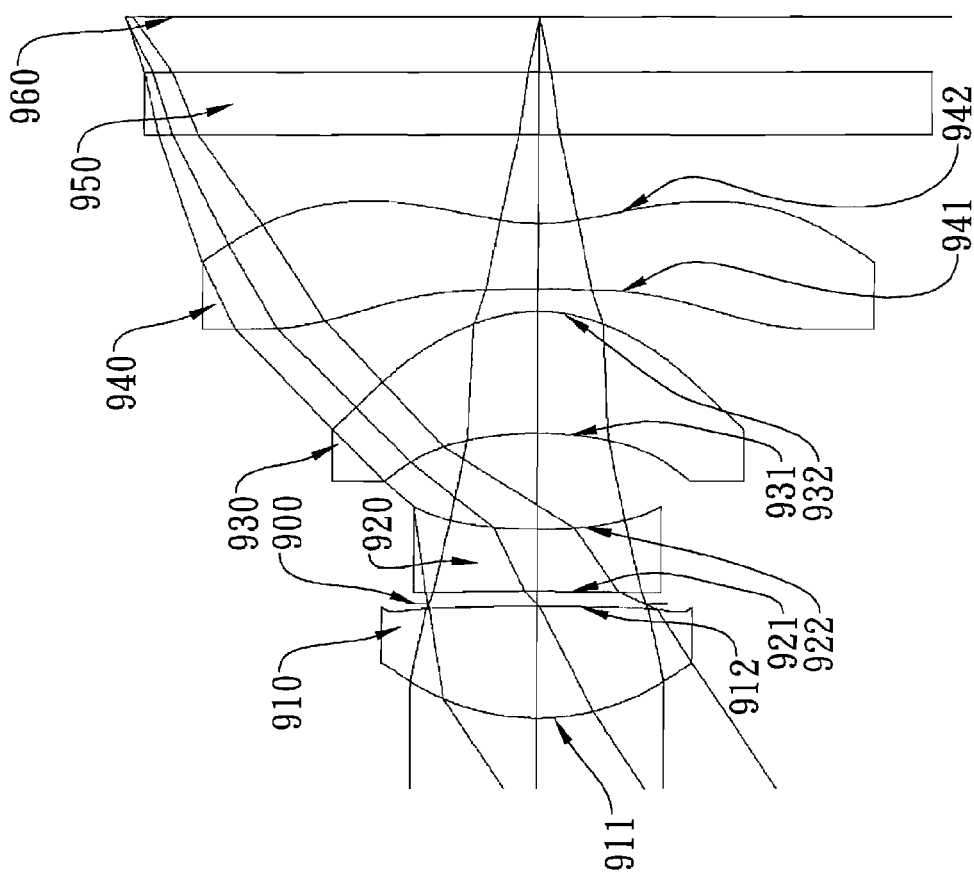
FIG. 9 shows a photographing optical lens assembly in accordance with a fifth embodiment of the present invention.
Figure 10:
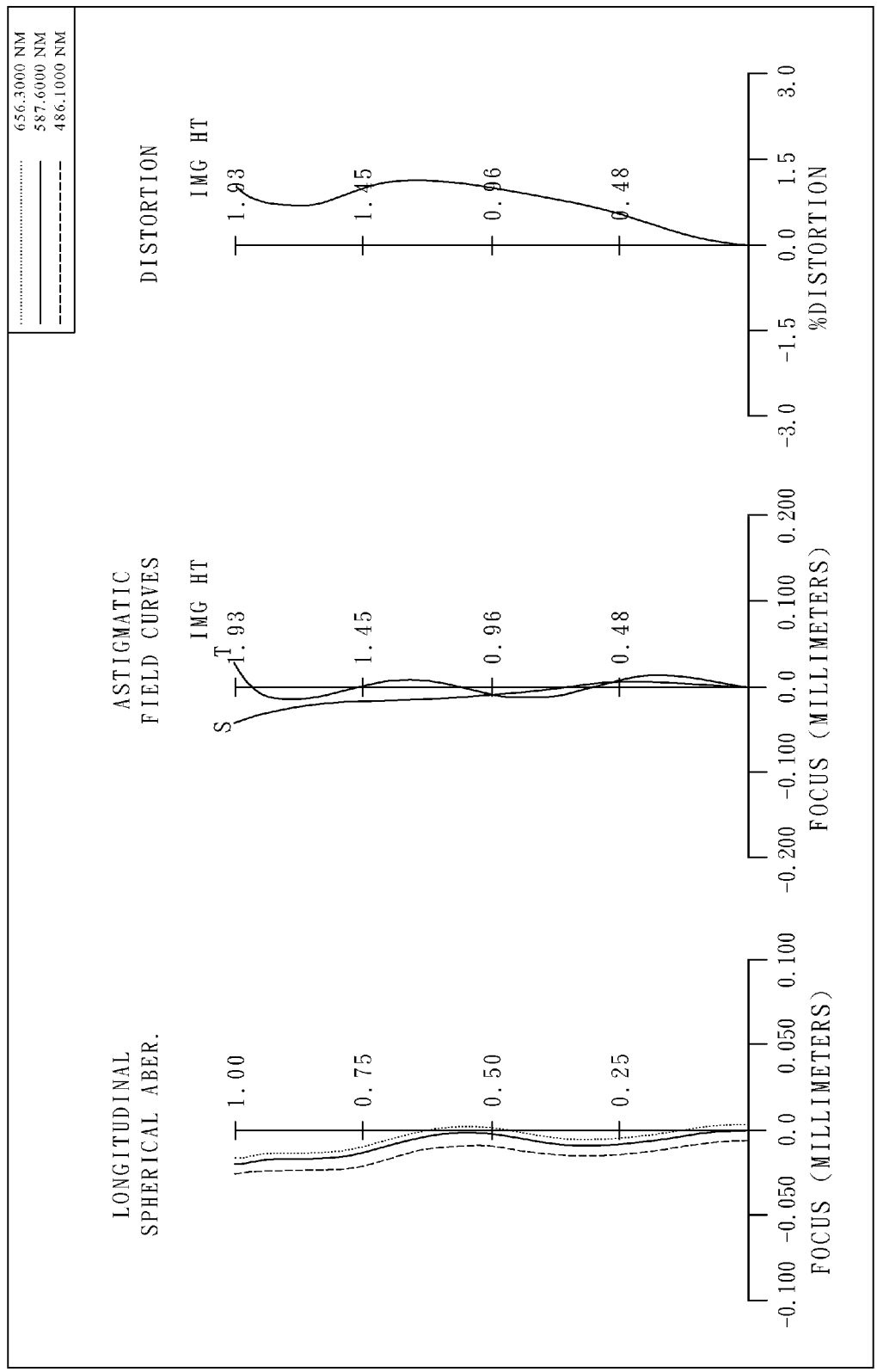
FIG. 10 shows the aberration curves of the fifth embodiment of the present invention.

FIG. 9 shows a photographing optical lens assembly in accordance with a fifth embodiment of the present invention, and FIG. 10 shows the aberration curves of the fifth embodiment of the present invention. The photographing optical lens assembly of the fifth embodiment of the present invention mainly comprises four lens elements, in order from the object side to the image side: a plastic first lens element 910 with positive refractive power having a convex object-side surface 911 and a convex image-side surface 912, the object-side and image-side surfaces 911 and 912 thereof being aspheric; a plastic second lens element 920 with negative refractive power having a concave object-side surface 921 and a concave image-side surface 922, the object-side and image-side surfaces 921 and 922 thereof being aspheric; a plastic third lens element 930 with positive refractive power having a concave object-side surface 931 and a convex image-side surface 932, the object-side and image-side surfaces 931 and 932 thereof being aspheric; a plastic fourth lens element 940 with negative refractive power having a concave object-side surface 941 and a concave image-side surface 942, the object-side and image-side surfaces 941 and 942 thereof being aspheric, at least one inflection point formed on the object-side surface 941 and the image-side surface 942; and wherein an aperture stop 900 is disposed between the first lens element 910 and the second lens element 920; wherein an IR filter 950 is disposed between the image-side surface 942 of the fourth lens element 940 and the image plane 960; and wherein the IR filter 950 is made of glass and has no influence on the focal length of the photographing optical lens assembly.

The equation of the aspheric surface profiles of the fifth embodiment has the same form as that of the first embodiment.

In the fifth embodiment of the present photographing optical lens assembly, the focal length of the photographing optical lens assembly is f, and it satisfies the relation: f=2.92 (mm).

In the fifth embodiment of the present photographing optical lens assembly, the f-number of the photographing optical lens assembly is Fno, and it satisfies the relation: Fno=2.47.

In the fifth embodiment of the present photographing optical lens assembly, half of the maximal field of view of the photographing optical lens assembly is HFOV, and it satisfies the relation: HFOV=33.1 deg.

In the fifth embodiment of the present photographing optical lens assembly, the Abbe number of the first lens element 910 is V1, the Abbe number of the second lens element 920 is V2, and they satisfy the relation: V1−V2=32.5.

In the fifth embodiment of the present photographing optical lens assembly, the distance on the optical axis between the first lens element 910 and the second lens element 920 is T12, the focal length of the photographing optical lens assembly is f, and they satisfy the relation: (T12/f)*100=2.5.

In the fifth embodiment of the present photographing optical lens assembly, the radius of curvature of the object-side surface 911 of the first lens element 910 is R1, the radius of curvature of the image-side surface 912 of the first lens element 910 is R2, and they satisfy the relation: R1/R2=−0.14.

In the fifth embodiment of the present photographing optical lens assembly, the radius of curvature of the object-side surface 921 of the second lens element 920 is R3, the radius of curvature of the image-side surface 922 of the second lens element 920 is R4, and they satisfy the relation: R3/R4=−2.94.

In the fifth embodiment of the present photographing optical lens assembly, the radius of curvature of the object-side surface 931 of the third lens element 930 is R5, the radius of curvature of the image-side surface 932 of the third lens element 930 is R6, and they satisfy the relations: R5/R6=2.53; and (R5+R6)/(R5−R6)=2.31.

In the fifth embodiment of the present photographing optical lens assembly, the radius of curvature of the object-side surface 911 of the first lens element 910 is R1, the focal length of the photographing optical lens assembly is f, and they satisfy the relation: R1/f=0.36.

In the fifth embodiment of the present photographing optical lens assembly, the radius of curvature of the image-side surface 942 of the first lens element 940 is R8, the focal length of the photographing optical lens assembly is f, and they satisfy the relation: R8/f=0.31.

In the fifth embodiment of the present photographing optical lens assembly, the focal length of the photographing optical lens assembly is f, the focal length of the first lens element 910 is f1, and they satisfy the relation: f/f1=1.68.

In the fifth embodiment of the present photographing optical lens assembly, the focal length of the photographing optical lens assembly is f, the focal length of the fourth lens element 940 is f4, and they satisfy the relation: f/f4=−1.83.

In the fifth embodiment of the present photographing optical lens assembly, the focal length of the third lens element 930 is f3, the focal length of the fourth lens element 940 is f4, and they satisfy the relation: f3/f4=−1.07.

In the fifth embodiment of the present photographing optical lens assembly, the focal length of the photographing optical lens assembly is f, the focal length of the first lens element 910 is f1, the focal length of the third lens element 930 is f3, and they satisfy the relation: (f/f1)−(f/f3)=−0.04.

In the fifth embodiment of the present photographing optical lens assembly, the photographing optical lens assembly further provides an electronic sensor at the image plane 960 for image formation; wherein the distance on the optical axis between the aperture stop 900 and the image plane 960 is SL, the distance on the optical axis between the object-side surface 911 of the first lens element 910 and the electronic sensor is TTL, and they satisfy the relation: SL/TTL=0.83. Furthermore, half of the diagonal length of the effective pixel area of the electronic sensor is ImgH, and they satisfy the relation: TTL/ImgH=1.71.

The detailed optical data of the fifth embodiment is shown in FIG. 23 (TABLE 9), and the aspheric surface data is shown in FIG. 24 (TABLES 10A and 10B), wherein the units of the radius of curvature, the thickness and the focal length are expressed in mm, and HFOV is half of the maximal field of view.

Figure 11:
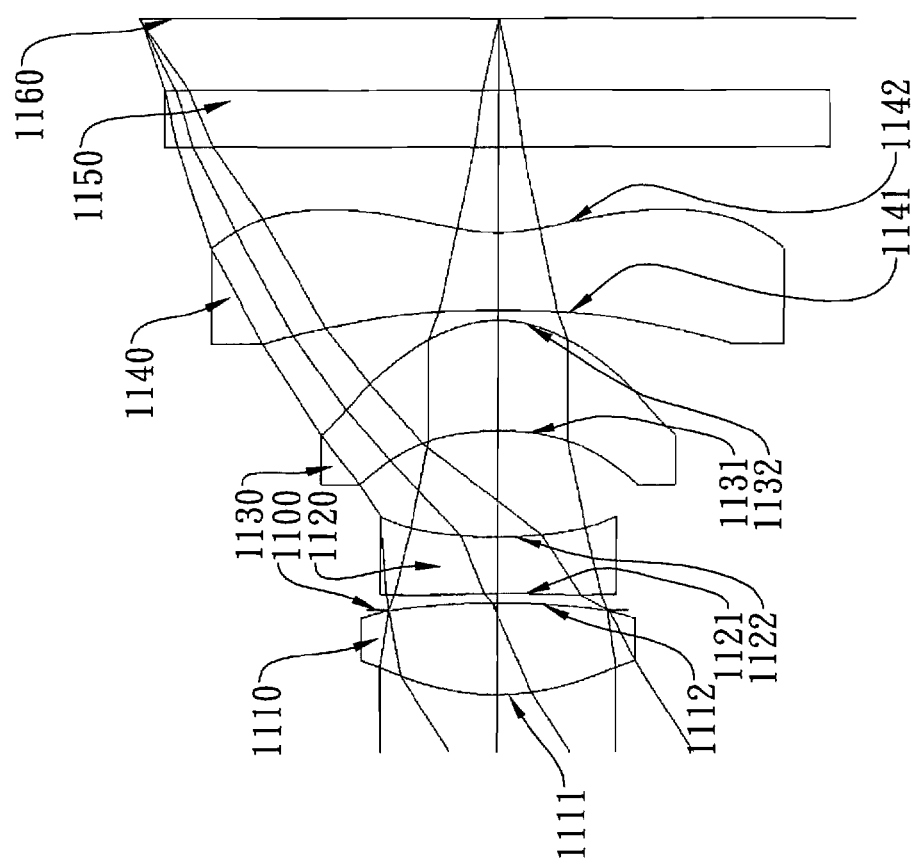
FIG. 11 shows a photographing optical lens assembly in accordance with a sixth embodiment of the present invention.
Figure 12:
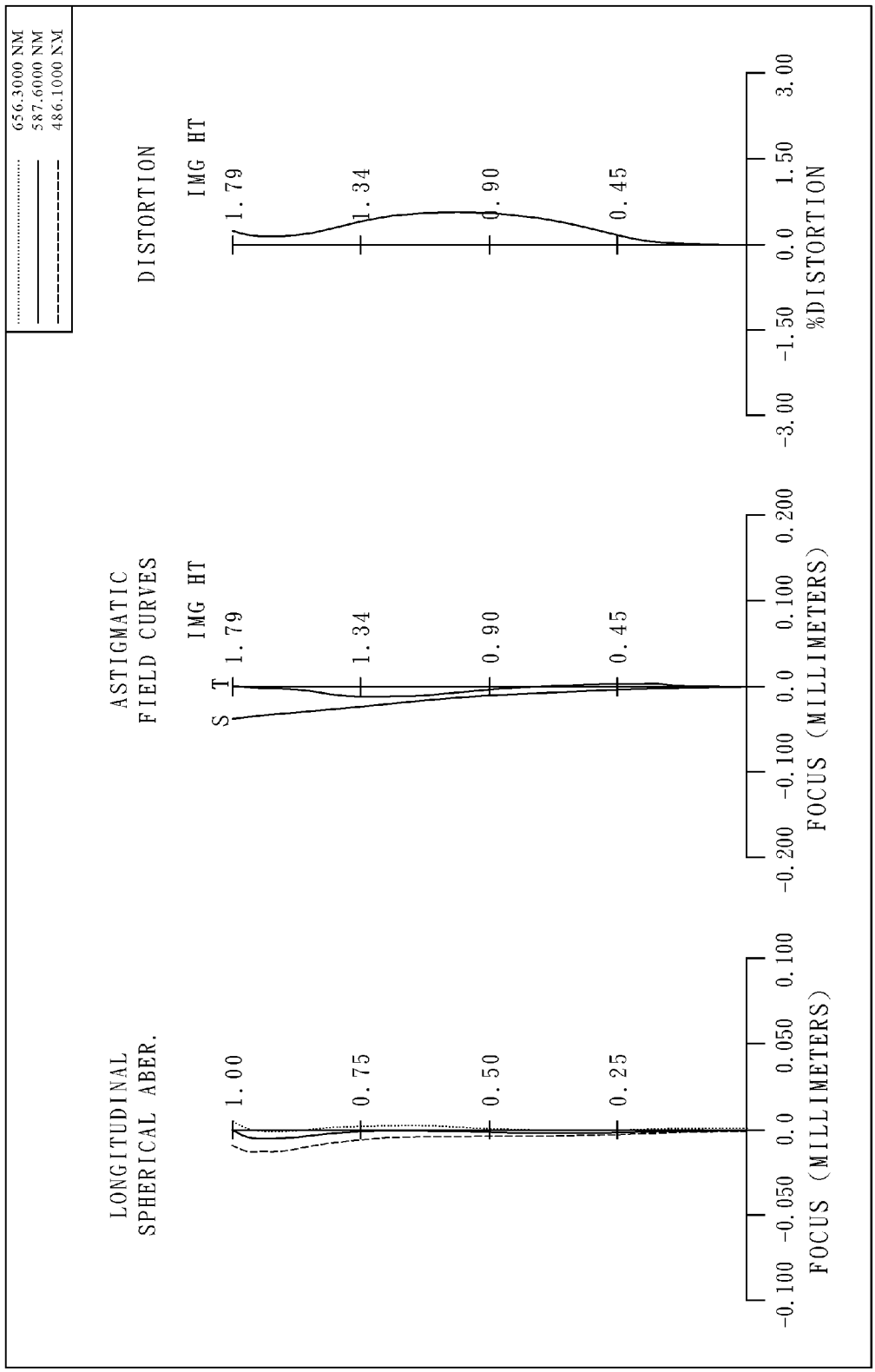
FIG. 12 shows the aberration curves of the sixth embodiment of the present invention.

FIG. 11 shows a photographing optical lens assembly in accordance with a sixth embodiment of the present invention, and FIG. 12 shows the aberration curves of the sixth embodiment of the present invention. The photographing optical lens assembly of the sixth embodiment of the present invention mainly comprises four lens elements, in order from the object side to the image side: a plastic first lens element 1110 with positive refractive power having a convex object-side surface 1111 and a convex image-side surface 1112, the object-side and image-side surfaces 1111 and 1112 thereof being aspheric; a plastic second lens element 1120 with negative refractive power having a concave object-side surface 1121 and a concave image-side surface 1122, the object-side and image-side surfaces 1121 and 1122 thereof being aspheric; a plastic third lens element 1130 with positive refractive power having a concave object-side surface 1131 and a convex image-side surface 1132, the object-side and image-side surfaces 1131 and 1132 thereof being aspheric; a plastic fourth lens element 1140 with negative refractive power having a concave object-side surface 1141 and a concave image-side surface 1142, the object-side and image-side surfaces 1141 and 1142 thereof being aspheric, at least one inflection point formed on the object-side surface 1141 and the image-side surface 1142; and wherein an aperture stop 1100 is disposed between the first lens element 1110 and the second lens element 1120; wherein an IR filter 1150 is disposed between the image-side surface 1142 of the fourth lens element 1140 and the image plane 1160; and wherein the IR filter 1150 is made of glass and has no influence on the focal length of the photographing optical lens assembly.

The equation of the aspheric surface profiles of the sixth embodiment has the same form as that of the first embodiment.

In the sixth embodiment of the present photographing optical lens assembly, the focal length of the photographing optical lens assembly is f, and it satisfies the relation: $f=2.92$ (mm).

In the sixth embodiment of the present photographing optical lens assembly, the f-number of the photographing optical lens assembly is Fno, and it satisfies the relation: $Fno=2.45$.

In the sixth embodiment of the present photographing optical lens assembly, half of the maximal field of view of the photographing optical lens assembly is HFOV, and it satisfies the relation: $HFOV=31.5$ deg.

In the sixth embodiment of the present photographing optical lens assembly, the Abbe number of the first lens element 1110 is V1, the Abbe number of the second lens element 1120 is V2, and they satisfy the relation: $V1-V2=32.5$.

In the sixth embodiment of the present photographing optical lens assembly, the distance on the optical axis between the first lens element 1110 and the second lens element 1120 is T12, the focal length of the photographing optical lens assembly is f, and they satisfy the relation: $(T12/f)*100=1.7$.

In the sixth embodiment of the present photographing optical lens assembly, the radius of curvature of the object-side surface 1111 of the first lens element 1110 is R1, the radius of curvature of the image-side surface 1112 of the first lens element 1110 is R2, and they satisfy the relation: $R1/R2=-0.35$.

In the sixth embodiment of the present photographing optical lens assembly, the radius of curvature of the object-side surface 1121 of the second lens element 1120 is R3, the radius of curvature of the image-side surface 1122 of the second lens element 1120 is R4, and they satisfy the relation: $R3/R4=-2.16$.

In the sixth embodiment of the present photographing optical lens assembly, the radius of curvature of the object-side surface 1131 of the third lens element 1130 is R5, the radius of curvature of the image-side surface 1132 of the third lens element 1130 is R6, and they satisfy the relations: $R5/R6=2.26$; and $(R5+R6)/(R5-R6)=2.59$.

In the sixth embodiment of the present photographing optical lens assembly, the radius of curvature of the object-side surface 1111 of the first lens element 1110 is R1, the focal length of the photographing optical lens assembly is f, and they satisfy the relation: $R1/f=0.41$.

In the sixth embodiment of the present photographing optical lens assembly, the radius of curvature of the image-side surface 1142 of the first lens element 1140 is R8, the focal length of the photographing optical lens assembly is f, and they satisfy the relation: $R8/f=0.30$.

In the sixth embodiment of the present photographing optical lens assembly, the focal length of the photographing optical lens assembly is f, the focal length of the first lens element 1110 is f1, and they satisfy the relation: $f/f1=1.71$.

In the sixth embodiment of the present photographing optical lens assembly, the focal length of the photographing optical lens assembly is f, the focal length of the fourth lens element 1140 is f4, and they satisfy the relation: $f/f4=-1.96$.

In the sixth embodiment of the present photographing optical lens assembly, the focal length of the third lens element 1130 is f3, the focal length of the fourth lens element 1140 is f4, and they satisfy the relation: $f3/f4=-0.98$.

In the sixth embodiment of the present photographing optical lens assembly, the focal length of the photographing optical lens assembly is f, the focal length of the first lens element 1110 is f1, the focal length of the third lens element 1130 is f3, and they satisfy the relation: $(f/f1)-(f/f3)=-0.29$.

In the sixth embodiment of the present photographing optical lens assembly, the photographing optical lens assembly further provides an electronic sensor at the image plane 1160 for image formation; wherein the distance on the optical axis between the aperture stop 1100 and the image plane 1160 is SL, the distance on the optical axis between the object-side surface 1111 of the first lens element 1110 and the electronic sensor is TTL, and they satisfy the relation: $SL/TTL=0.87$. Furthermore, half of the diagonal length of the effective pixel area of the electronic sensor is ImgH, and they satisfy the relation: $TTL/ImgH=1.94$.

The detailed optical data of the sixth embodiment is shown in FIG. 25 (TABLE 11), and the aspheric surface data is shown in FIG. 26 (TABLES 12A and 12B), wherein the units of the radius of curvature, the thickness and the focal length are expressed in mm, and HFOV is half of the maximal field of view.

Figure 13:
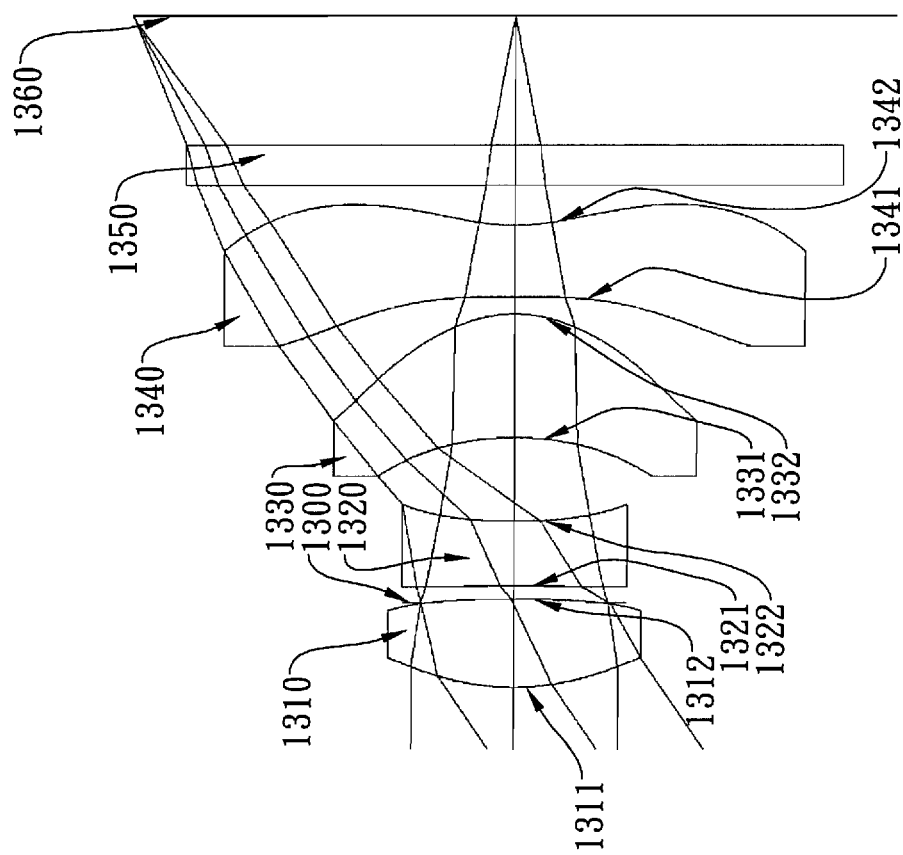
FIG. 13 shows a photographing optical lens assembly in accordance with a seventh embodiment of the present invention.
Figure 14:
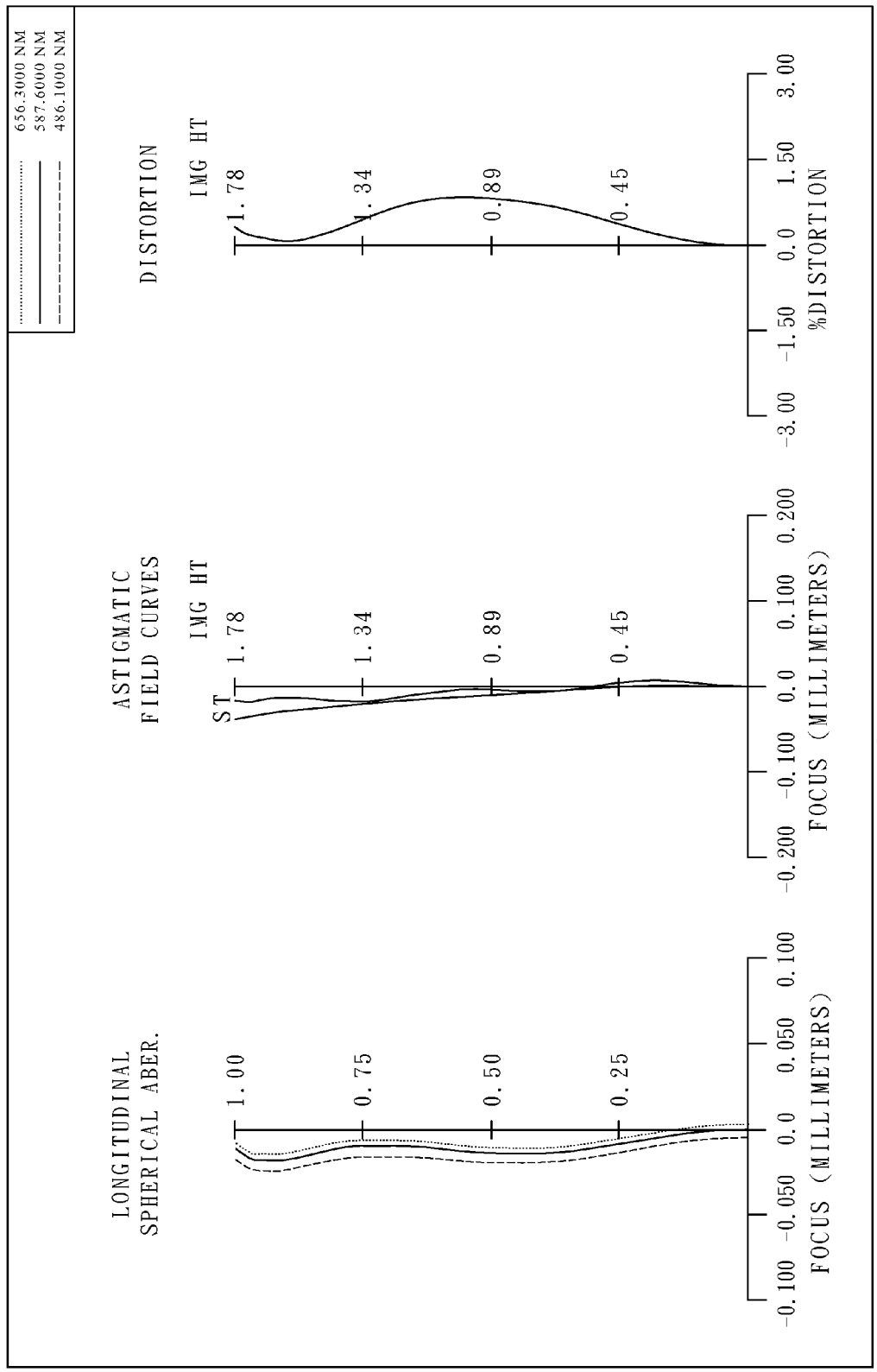
FIG. 14 shows the aberration curves of the seventh embodiment of the present invention.

FIG. 13 shows a photographing optical lens assembly in accordance with a seventh embodiment of the present invention, and FIG. 14 shows the aberration curves of the seventh embodiment of the present invention. The photographing optical lens assembly of the seventh embodiment of the present invention mainly comprises four lens elements, in order from the object side to the image side: a plastic first lens element 1310 with positive refractive power having a convex object-side surface 1311 and a convex image-side surface 1312, the object-side and image-side surfaces 1311 and 1312 thereof being aspheric; a plastic second lens element 1320 with negative refractive power having a concave object-side surface 1321 and a concave image-side surface 1322, the object-side and image-side surfaces 1321 and 1322 thereof being aspheric; a plastic third lens element 1330 with positive refractive power having a concave object-side surface 1331 and a convex image-side surface 1332, the object-side and image-side surfaces 1331 and 1332 thereof being aspheric; a plastic fourth lens element 1340 with negative refractive power having a concave object-side surface 1341 and a concave image-side surface 1342, the object-side and image-side surfaces 1341 and 1342 thereof being aspheric, at least one inflection point formed on the object-side surface 1341 and image-side surface 1342; and wherein an aperture stop 1300 is disposed between the first lens element 1310 and the second lens element 1320; wherein an IR filter 1350 is disposed between the image-side surface 1342 of the fourth lens element 1340 and the image plane 1360; and wherein the IR filter 1350 is made of glass and has no influence on the focal length of the photographing optical lens assembly.

The equation of the aspheric surface profiles of the seventh embodiment has the same form as that of the first embodiment.

In the seventh embodiment of the present photographing optical lens assembly, the focal length of the photographing optical lens assembly is f, and it satisfies the relation: f=2.74 (mm).

In the seventh embodiment of the present photographing optical lens assembly, the f-number of the photographing optical lens assembly is Fno, and it satisfies the relation: Fno=2.85.

In the seventh embodiment of the present photographing optical lens assembly, half of the maximal field of view of the photographing optical lens assembly is HFOV, and it satisfies the relation: HFOV=33.0 deg.

In the seventh embodiment of the present photographing optical lens assembly, the Abbe number of the first lens element 1310 is V1, the Abbe number of the second lens element 1320 is V2, and they satisfy the relation: V1−V2=32.5.

In the seventh embodiment of the present photographing optical lens assembly, the distance on the optical axis between the first lens element 1310 and the second lens element 1320 is T12, the focal length of the photographing optical lens assembly is f, and they satisfy the relation: (T12/f)*100=2.4.

In the seventh embodiment of the present photographing optical lens assembly, the radius of curvature of the object-side surface 1311 of the first lens element 1310 is R1, the radius of curvature of the image-side surface 1312 of the first lens element 1310 is R2, and they satisfy the relation: R1/R2=−0.26.

In the seventh embodiment of the present photographing optical lens assembly, the radius of curvature of the object-side surface 1321 of the second lens element 1320 is R3, the radius of curvature of the image-side surface 1322 of the second lens element 1320 is R4, and they satisfy the relation: R3/R4=−2.69.

In the seventh embodiment of the present photographing optical lens assembly, the radius of curvature of the object-side surface 1331 of the third lens element 1330 is R5, the radius of curvature of the image-side surface 1332 of the third lens element 1330 is R6, and they satisfy the relations: R5/R6=2.46; and (R5+R6)/(R5−R6)=2.37.

In the seventh embodiment of the present photographing optical lens assembly, the radius of curvature of the object-side surface 1311 of the first lens element 1310 is R1, the focal length of the photographing optical lens assembly is f, and they satisfy the relation: R1/f=0.41.

In the seventh embodiment of the present photographing optical lens assembly, the radius of curvature of the image-side surface 1342 of the first lens element 1340 is R8, the focal length of the photographing optical lens assembly is f, and they satisfy the relation: R8/f=0.31.

In the seventh embodiment of the present photographing optical lens assembly, the focal length of the photographing optical lens assembly is f, the focal length of the first lens element 1310 is f1, and they satisfy the relation: f/f1=1.62.

In the seventh embodiment of the present photographing optical lens assembly, the focal length of the photographing optical lens assembly is f, the focal length of the fourth lens element 1340 is f4, and they satisfy the relation: f/f4=−2.00.

In the seventh embodiment of the present photographing optical lens assembly, the focal length of the third lens element 1330 is f3, the focal length of the fourth lens element 1340 is f4, and they satisfy the relation: f3/f4=−1.01.

In the seventh embodiment of the present photographing optical lens assembly, the focal length of the photographing optical lens assembly is f, the focal length of the first lens element 1310 is f1, the focal length of the third lens element 1330 is f3, and they satisfy the relation: (f/f1)−(f/f3)=−0.35.

In the seventh embodiment of the present photographing optical lens assembly, the photographing optical lens assembly further provides an electronic sensor at the image plane 1360 for image formation; wherein the distance on the optical axis between the aperture stop 1300 and the image plane 1360 is SL, the distance on the optical axis between the object-side surface 1311 of the first lens element 1310 and the electronic sensor is TTL, and they satisfy the relation: SL/TTL=0.87. Furthermore, half of the diagonal length of the effective pixel area of the electronic sensor is ImgH, and they satisfy the relation: TTL/ImgH=1.82.

The detailed optical data of the seventh embodiment is shown in FIG. 27 (TABLE 13), and the aspheric surface data is shown in FIG. 28 (TABLES 14A and 14B), wherein the units of the radius of curvature, the thickness and the focal length are expressed in mm, and HFOV is half of the maximal field of view.

It is to be noted that TABLES 1-14 (illustrated in FIGS. 15-28 respectively) show different data of the different embodiments, however, the data of the different embodiments are obtained from experiments. Therefore, any photographing optical lens assembly of the same structure is considered to be within the scope of the present invention even if it uses different data. The embodiments depicted above and the appended drawings are exemplary and are not intended to limit the claim scope of the present invention. TABLE 15 (illustrated in FIG. 29) shows the data of the respective embodiments resulting from the equations.

What is claimed is:

1. A photographing optical lens assembly comprising, in order from an object side to an image side:
   a first lens element with positive refractive power having a convex object-side surface and a convex image-side surface;
   a second lens element with negative refractive power having a concave image-side surface;
   a third lens element with positive refractive power having a concave object-side surface and a convex image-side surface, at least one of the object-side and image-side surfaces thereof being aspheric; and
   a fourth lens element with negative refractive power having a concave image-side surface, both of the object-side and image-side surfaces thereof being aspheric, at least one inflection point formed on the object-side and image-side surfaces;
   wherein the photographing optical lens assembly further comprises an aperture stop, disposed between the first lens element and the second element, and an electronic sensor, disposed at the image plane for image formation;
   wherein there are four lens elements with refractive power in the photographing optical lens assembly; and wherein a focal length of the photographing optical lens assembly is f, a focal length of the fourth lens element is f4, a radius of curvature of the object-side surface of the third lens element is R5, a radius of curvature of the image-side surface of the third lens element is R6, an Abbe number of the first lens element is V1, an Abbe number of the second lens element is V2, a distance on the optical axis between the aperture stop and the image plane is SL, a distance on the optical axis between the object-side surface of the first lens element and the electronic sensor is TTL, and they satisfy the relations:

$-2.5 < f/f4 < -1.5;$ $2.0 < (R5+R6)/(R5-R6) < 5.0;$ $31.0 < V1-V2 < 42.0;$ and $0.77 < SL/TTL < 0.92.$ 2. The photographing optical lens assembly according to claim 1, wherein a radius of curvature of the object-side surface of the third lens element is R5, a radius of curvature of the image-side surface of the third lens element is R6, and they satisfy the relation: $2.2 < (R5+R6)/(R5-R6) < 2.8$.

3. The photographing optical lens assembly according to claim 2, wherein the focal length of the photographing optical lens assembly is f, the focal length of the fourth lens element is f4, and they satisfy the relation: $-2.2 < f/f4 < -1.8$.

4. The photographing optical lens assembly according to claim 3, wherein the fourth lens element has a concave object-side surface, a distance on the optical axis between the first and second lens elements is T12, the focal length of the photographing optical lens assembly is f, and they satisfy the relation: $0.5 < (T12/f)*100 < 4.0$.

5. The photographing optical lens assembly according to claim 3, wherein the second lens element has a concave object-side surface.

* * * * *